US009208612B2

(12) United States Patent
Frahm et al.

(10) Patent No.: US 9,208,612 B2
(45) Date of Patent: Dec. 8, 2015

(54) SYSTEMS AND METHODS THAT GENERATE HEIGHT MAP MODELS FOR EFFICIENT THREE DIMENSIONAL RECONSTRUCTION FROM DEPTH INFORMATION

(75) Inventors: Jan-Michael Frahm, Chapel Hill, NC (US); Marc Andre Leon Pollefeys, Zurich (CH); David Robert Gallup, Bothell, WA (US)

(73) Assignees: The University of North Carolina at Chapel Hill, Chapel Hill, NC (US); Eidgenossische Technische Hochschule Zurich, Zurich (CH)

( * ) Notice: Subject to any disclaimer, the term of this patent is extended or adjusted under 35 U.S.C. 154(b) by 180 days.

(21) Appl. No.: 13/578,758

(22) PCT Filed: Feb. 11, 2011

(86) PCT No.: PCT/US2011/024461
§ 371 (c)(1),
(2), (4) Date: Nov. 19, 2012

(87) PCT Pub. No.: WO2011/152895
PCT Pub. Date: Dec. 8, 2011

(65) Prior Publication Data
US 2013/0060540 A1 Mar. 7, 2013

Related U.S. Application Data

(60) Provisional application No. 61/304,112, filed on Feb. 12, 2010.

(51) Int. Cl.
*G06T 15/06* (2011.01)
*G06T 17/05* (2011.01)
*G06T 17/00* (2006.01)

(52) U.S. Cl.
CPC .............. *G06T 17/05* (2013.01); *G06T 15/06* (2013.01); *G06T 17/00* (2013.01); *G06T 2210/04* (2013.01)

(58) Field of Classification Search
None
See application file for complete search history.

(56) References Cited

U.S. PATENT DOCUMENTS 6,432,056 B1 8/2002 Cooley et al.
2006/0268153 A1* 11/2006 Rice et al. .................... 348/370
(Continued)

OTHER PUBLICATIONS

Tison et al. "A Fusion Scheme for Joint Retrieval of Urban Height Map and Classification from High-resolution Interferometric SAR Images." IEEE Transactions on Geoscience and Remote Sensing, vol. 45, No. 2, Feb. 2007, pp. 496-505.*
(Continued)

*Primary Examiner* — Jon Chang
(74) *Attorney, Agent, or Firm* — Jenkins, Wilson, Taylor & Hunt, P.A.

(57) ABSTRACT

Methods of generating a three dimensional representation of an object in a reference plane from a depth map including distances from a reference point to pixels in an image of the object taken from a reference point. Weights are assigned to respective voxels in a three dimensional grid along rays extending from the reference point through the pixels in the image based on the distances in the depth map from the reference point to the respective pixels, and a height map including an array of height values in the reference plane is formed based on the assigned weights. An n-layer height map may be constructed by generating a probabilistic occupancy grid for the voxels and forming an n-dimensional height map comprising an array of layer height values in the reference plane based on the probabilistic occupancy grid.

31 Claims, 15 Drawing Sheets

(56) References Cited

U.S. PATENT DOCUMENTS

2009/0129690 A1    5/2009  Marcellin et al.
2010/0197392 A1*   8/2010  Geiss .............................. 463/30

OTHER PUBLICATIONS

Curless et al. "A Volumetric Method for Building Complex Models from Range Images." SIGGRAPH '96, Proceedings of the 23rd Annual Conference on Computer Graphics and Interactive Techniques, ACM, 1996, pp. 303-312.*

Notification of Transmittal of the International Search Report and the Written Opinion of the International Searching Authority, or the Declaration for International Application No. PCT/US2011/024461 (Nov. 23, 2011).

Xiao et al., "Image-based Street-sdie City Modeling," SIGGRAPH Asia '09, pp. 1-12 (2009).

Liu et al., "Accurate and Robust Centerline Extraction from Tubular Structures in Medical Images," Advances in Information & Intelligent Sys., SCI 251, pp. 139-162 (2009).

Shade et al., "Layered Depth Images," SIGGRAPH 98, pp. 231-242 (1998).

Cornelis, et al., "3d Urban Scene Modeling Integrating Recognition and Reconstruction", International Journal of Computer Vision (2008).

Früh et al., Data Processing Algorithms for Generating Textured 3d Building Facade Meshes From Laser Scans and Camera Images, International Journal of Computer Vision (2005).

Pollefeys et al., "Detailed Real-Time Urban 3d Reconstruction From Video", Intl. Journal of Computer Vision (2008).

Zebedin et al., "Fusion of Feature- and Area-Based Information for Urban Buildings Modeling From Aerial Imagery", European Conference on Computer Vision (2008).

Früh et al., "An Automated Method for Large-Scale, Ground-Based City Model Acquisition", International Journal of Computer Vision, vol. 60, No. 1, pp. 5-24 (Oct. 2004).

Irschara et al., "Towards Wiki-Based Dense City Modeling", Workshop on Virtual Representations and Modeling of Large-scale environments (2007).

Merrell et al., "Real-Time Visibility-Based Fusion of Depth Maps", ICCV (2007).

Scharstein et al., "A Taxonomy and Evaluation of Dense Two-Frame Stereo Correspondence Algorithms", Intl. Journal of Computer Vision (2002).

Seitz et al., "A Comparison and Evaluation of Multi-View Stereo Reconstruction Algorithms", Computer Vision and Pattern Recognition (2006).

Guan et al., "3d Object Reconstruction With Heterogeneous Sensor Data", 3DPVT (2008).

Cornelis et al., "Fast Compact City Modeling for Navigation Pre-Visualization", Computer Vision and Pattern Recognition (2006).

Teller, "Automated Urban Model Acquisition: Project Rationale and Status", Image Understanding Workshop, pp. 455-462 (1998).

Furukawa et al., "Manhattan-World Stereo", Proceedings IEEE CVPR (2009).

Sinha et al., "Piecewise Planar861 Stereo for Image-Based Rendering", Proceedings IEEE ICCV (2009).

Zach et al., "A Globally Optimal Algorithm for Robust Tv-L1 Range Image Integration", International Conference on Computer Vision (2007).

Kim et al., "Gain Adaptive Real-Time Stereo Streaming", International Conference on Computer Vision Systems (2007).

Pollefeys et al., "Visual Modeling With a Handheld Camera", Intl. Journal of Computer Vision (2004).

Communication of European publication number and information on the application of Article 67(3) EPC for European Application No. 11790124.9 (Nov. 21, 2012).

* cited by examiner (a) 1 Layer  (b) 3 Layer (a) 1 Layer  (c) 3 Layer (b) 1 Layer  (d) 3 Layer (a)

(b)

Original     Model     Model (a)     (b)     (c)

SYSTEMS AND METHODS THAT GENERATE HEIGHT MAP MODELS FOR EFFICIENT THREE DIMENSIONAL RECONSTRUCTION FROM DEPTH INFORMATION

STATEMENT OF PRIORITY

This application claims the benefit, under 35 U.S.C. §119(e), of U.S. Provisional Application No. 61/304,112, filed Feb. 12, 2010, the entire contents of which are incorporated by reference herein.

STATEMENT OF U.S. GOVERNMENT INTEREST

This invention was made with Government support under Contract No. DE-FG52-08NA28778 awarded by The U.S. Department of Energy. The Government has certain rights in the invention.

BACKGROUND

Automatic large-scale three-dimensional (3D) reconstruction of urban environments using data obtained from ground reconnaissance video or active sensors like LIDAR (Light Detection And Ranging, an optical remote sensing technology that measures properties of scattered light to find range and/or other information of a distant target) is a very active research topic at the intersection of computer vision and computer graphics. Such techniques are discussed, for example, in N. Cornelis et al., *3d Urban Scene Modeling Integrating Recognition And Reconstruction*, International Journal of Computer Vision (2008), C. Frith et al., *Data Processing Algorithms For Generating Textured 3d Building Facade Meshes From Laser Scans And Camera Images*, International Journal of Computer Vision (2005), M. Pollefeys et al., *Detailed Real-Time Urban 3d Reconstruction From Video*, Intl. Journal of Computer Vision (2008) ("Polleyfeys I"), L. Zebedin et al., *Fusion Of Feature-And Area-Based Information For Urban Buildings Modeling From Aerial Imagery*, European Conference on Computer Vision (2008), and J. Xiao et al., *Image-Based Street-Side City Modeling*, SIGGRAPH Asia (2009). The applications of these techniques are very broad, from augmenting maps as in Google Earth or Microsoft Bing Maps, to civil and military planning, and entertainment.

One important aspect of most current research efforts is obtaining the computational efficiency that can enable the modeling of wide area urban environments, such as entire cities. The data sets resulting from data collection of such areas may be massive. Even a small town may require millions of frames of video just to capture the major streets. The reconstruction algorithms employed should be fast in order to finish processing in a reasonable amount of time. Additionally, the generated models should preferably be compact so that they can be efficiently stored, transmitted, and/or rendered.

There are typically two parts to a system that performs three dimensional reconstruction from video. The first part performs camera motion estimation from the video frames, commonly called Structure from Motion (SfM) or sparse reconstruction, due to the fact that as a byproduct it determines the three dimensional positions of salient feature points of the environment from the video frames. The second part performs the so called dense reconstruction, which obtains a dense scene geometry using the known camera positions and the video frames. As will be appreciated, "dense" three dimensional reconstruction attempts to reconstruct a three dimensional geometry using many points of an image, and is contrasted with sparse reconstruction, which only uses a few characteristic features of the image for three dimensional reconstruction. In some approaches, such as the approach described in Polleyfeys I, the robustness and drift of sparse estimation can be improved through additional sensors, such as inertial navigation systems (INS) and global positioning system (GPS) sensors, which may also remove the ambiguity in scale inherent in Structure from Motion (SfM), and provide an absolute coordinate system. The dense reconstruction subproblem involves performing stereo matching, depth map fusion, or other means to generate a three dimensional model, as for example LIDAR, as discussed in C. Früh et al., *Data Processing Algorithms For Generating Textured 3d Building Facade Meshes From Laser Scans And Camera Images*, International Journal of Computer Vision (2005).

Three dimensional scanning technologies include contact, ground-based surveying, ground-based LIDAR, aerial LIDAR and radar, aerial surveying, aerial stereo, ground reconnaissance video surveying, and others.

Three-dimensional reconstruction systems may include manual systems and user-assisted systems, such as the commercial products PhotoModeler, and Pictometry, as well as fully automatic research systems such as the hand-held modeling techniques described in Polleyfeys I.

Three-dimensional reconstruction systems are typically targeted toward city modeling, and include ground-based LIDAR as discussed in C. Früh et al., *Data Processing Algorithms For Generating Textured 3d Building Facade Meshes From Laser Scans And Camera Images*, International Journal of Computer Vision (2005), ground and aerial LIDAR as discussed in C. Früh et al., *An Automated Method For Large-Scale, Ground-Based City Model Acquisition*, International Journal of Computer Vision, Vol. 60, No. 1, (October 2004), pp. 5-24, and ground-based stereo techniques, such as Urbanscape discussed in Pollefeys I and WikiVienna as described in A. Irschara et al., *Towards Wiki-Based Dense City Modeling*, Workshop on Virtual Representations and Modeling of Large-scale environments (2007).

Furthermore, range-image fusion techniques such as Poisson blending and Visibility-based techniques have been described, such as in P. Merrell et al., *Real-Time Visibility-Based Fusion Of Depth Maps*, ICCV (2007).

In particular, a number of three dimensional reconstruction methods that address the dense reconstruction subproblem have been proposed. Multi-view stereo is a passive sensing technique which uses multiple photographs or video frames with known camera positions to measure depth. The depth of each pixel in the image is recovered and stored in a depth map. A taxonomy of stereo algorithms is given by D. Scharstein et al., *A Taxonomy And Evaluation Of Dense Two-Frame Stereo Correspondence Algorithms*, Intl. Journal of Computer Vision (2002). An overview of multi-view stereo for object centered scenes is given in S. Seitz et al., *A Comparison And Evaluation Of Multi-View Stereo Reconstruction Algorithms*, Computer Vision and Pattern Recognition (2006). Three dimensional reconstruction from video has been addressed in M. Pollefeys et al., *Visual Modeling With A Handheld Camera*, Intl. Journal of Computer Vision (2004), which uses uncalibrated hand-held video as input and obtained reconstructions of hundreds of frames, but could not handle wide-area scenes. The system presented by Pollefeys I was designed to process wide-area scenes. The resulting three dimensional models are generally three dimensional surfaces represented as texture-mapped polygonal meshes, which may result in problems, such as holes in homogeneous areas and windows, and slightly inaccurate geometry on facades deviating from the true planar geometry, which may cause visually disturbing artifacts.

There are several recent approaches deploying simplified geometries, as described, for example, in N. Cornelis et al., *Fast Compact City Modeling For Navigation Pre-Visualization*, Computer Vision and Pattern Recognition (2006) ("Cornelis I"), N. Cornelis et al., *3d Urban Scene Modeling Integrating Recognition And Reconstruction*, International Journal of Computer Vision (2008) ("Cornelis II"), Y. Furukawa et al., *Manhattan-World Stereo*, Proceedings IEEE CVPR (2009), and S. N. Sinha et al., *Piecewise Planar861 Stereo For Image-Based Rendering*, Proceedings IEEE ICCV (2009). Cornelis I uses simple U-shaped ruled surface model to efficiently produce compact street models. To enhance the appearance of cars and pedestrians not modeled through the ruled surface model, Cornelis II extends the approach to detect and replace those items through explicit template models. Furukawa et al. uses a very specific Manhattan-world model, where all planes must be orthogonal, and Sinha et al. uses a general piecewise planar model. Non-planar surfaces are either reconstructed with a staircase appearance or are flattened to nearby planes.

Other depth map fusion techniques, such as those discussed in C. Zach et al., *A Globally Optimal Algorithm For Robust Tv-L1 Range Image Integration*, International Conference on Computer Vision (2007 March), use an occupancy grid for depth map fusion but require the occupancy grid to be present in memory, leading to limitations on the model resolution.

Several methods have been aimed directly at modeling buildings from street-side imagery. J. Xiao et al., *Image-Based Street-Side City Modeling*, SIGGRAPH Asia (2009) present an automatic method that learns the appearance of buildings, segments them in the images, and reconstructs them as flat rectilinear surfaces. The modeling framework of Xiao et al. only supports automatic reconstruction and does not attempt to geometrically represent other scene parts, such as vegetation, that may typically be present in many urban scenes.

SUMMARY

Methods of generating a three dimensional representation of an object in a reference plane according to some embodiments include providing a two dimensional grid of cells that define the reference plane in which at least a portion of the object may be located, providing a three dimensional grid of voxels that define a physical volume above the two-dimensional grid of cells, and providing a depth map including distances from a reference point to pixels in an image of the object taken from the reference point, wherein the pixels in the image correspond to features of the object visible in the image.

Weights are assigned to respective ones of the voxels in the three dimensional grid along rays extending from the reference point through the pixels in the image based on the distances in the depth map from the reference point to the respective pixels, and a height map including an array of height values in the reference plane is formed based on the assigned weights.

The methods may further include assigning weights to at least some voxels in a column of voxels extending from the reference plane, and generating a height for the column in response to the weights in the column.

Generating the height for the column may include evaluating a cost function. The cost function compares a number of full voxels below a chosen height with a number of empty voxels above the chosen height.

The plurality of weights may include a first plurality of weights, and the method may further include providing a second depth map including distances from a second reference point to pixels in a second image of the object taken from the second reference point, assigning a second plurality of weights to the respective ones of the voxels in the three dimensional grid along rays extending from the second reference point through the pixels in the second image based on the distances in the second depth map, and combining the first and second weights.

Combining the first and second weights may include generating mean values of the first and second weights.

Forming the height map including the two-dimensional array of height values in the reference plane based on the assigned weights may include evaluating a cost function for voxels in respective columns of voxels.

The cost function may have the form:

$$c_z = \sum_{v_z > z} \phi_v - \sum_{v_z < z} \phi_v$$

where z is a chosen height value, $v_z$ is a z coordinate of the center of each voxel, and $\phi_v$ is a mean number of votes in a voxel.

Assigning the weights may include assigning a negative weight to a voxel that is located closer to the reference point than the distance in the depth map of a ray extending through the voxel.

Assigning the weights may include assigning a positive weight to a voxel that is located farther from the reference point than the distance in the depth map of a ray extending through the voxel.

Assigning the weights may include assigning a positive weight that decreases with distance from the reference point to a voxels that is located farther from the reference point than the distance in the depth map of a ray extending through the voxel.

The weights may be assigned according to the following equation:

$$\phi_p = \begin{cases} -\lambda_{empty} & \text{if } \rho_v < \rho_p \\ e^{\frac{-|\rho_v - \rho_p|}{\sigma}} & \text{if } \rho_p \geq \rho_p \end{cases} \quad (1)$$

where $\rho_p$ and $\rho_v$ are the distance values for the pixel and the voxel from the reference point, σ is a constant that defines the rate at which the weight decreases with distance from the pixel, and $-\lambda_{empty}$ is the weight for voxels that are located closer to the reference point than the distance in the depth map of the ray extending through the voxel.

The height map may include an n-layer directional height map in which multiple heights may be stored for each element in the array. The height values represent transitions from full to empty or empty to full.

A system for generating a vertical height map model of an object in a reference plane according to some embodiments includes a database including a depth map including distances from a reference point to pixels in an image of the object taken from the reference point, the pixels in the image correspond to features of the object visible in the image, and a three dimensional modeling system coupled to the database and configured to assign weights to respective voxels in a three dimensional grid in which the object may be at least partially disposed along rays extending from the reference point through the pixels in the image based on the distances in the depth map from the reference point to the respective pixels. The rendering system is also configured to form a height map including an array of height values in the reference plane based on the assigned weights.

The three dimensional modeling system may be further configured to assign a second plurality of weights to the respective ones of the voxels in the three dimensional grid along rays extending from a second reference point through pixels in a second image based on the distances in a second depth map, and to combine the first and second weights.

The three dimensional modeling system may be configured to combine the first and second weights by generating mean values of the first and second weights.

The three dimensional modeling system may be further configured to form the height map including the two-dimensional array of height values in the reference plane based on the assigned weights by evaluating a cost function for voxels in respective columns of voxels.

The three dimensional modeling system may be further configured to assign a negative weight to a voxel that is located closer to the reference point than the distance in the depth map of a ray extending through the voxel.

The three dimensional modeling system may be further configured to assign a positive weight to a voxel that is located farther from the reference point than the distance in the depth map of a ray extending through the voxel.

The three dimensional modeling system may be further configured to assign a positive weight that decreases with distance from the reference point to a voxel that is located farther from the reference point than the distance in the depth map of a ray extending through the voxel.

Methods of generating a three dimensional representation of an object in a reference plane according to further embodiments include providing a two dimensional grid of cells that define the reference plane in which at least a portion of the object may be located, providing a three dimensional grid of voxels that define a physical volume above the two-dimensional grid of cells, and providing a depth map including distances from a reference point to pixels in an image of the object taken from the reference point, the pixels in the image correspond to features of the object visible in the image. A probabilistic occupancy grid is generated, and an n-dimensional height map including an array of layer height values in the reference plane is formed based on the probabilistic occupancy grid.

The methods may further include determining a probability of a layer in a column of voxels having a given height based on the distances in the depth map.

The methods may further include evaluating a cost function based on the probability of the layer in the column of voxels having a given height.

The cost function may have the form $$C = -\ln P(Z|L) P(L)$$

where P(Z|L) is the probability of a distance measurement Z given a layer height L and P(L) is the probability of a layer height L.

The methods may further include evaluating the cost function recursively for k layers according to the function $$C_k(l) = \begin{cases} I_{l'}^{l} + C_{k-1}(l') & \text{if odd}(k) \\ \bar{I}_{l'}^{l} + C_{k-1}(l') & \text{if even}(k) \end{cases},$$

where $$I_a^b = -\sum_{i=a}^{b} (\ln P(Z \mid O_i) + \ln P(O_i))$$

$$\bar{I}_a^b = -\sum_{i=a}^{b} (\ln P(Z \mid \neg O_i) + \ln P(\neg O_i)),$$

$$l' = \arg\min_{l' \le l} C_{k-1}(l'),$$

$$C_0(l) = 0,$$

$P(Z|O_i)$ is the probability of a distance measurement Z given that voxel i is occupied, $P(Z|\neg O_i)$ is the probability of a distance measurement Z given that voxel i is not occupied, $P(O_i)$ is the probability that voxel i is occupied, and $P(\neg O_i)$ is the probability that voxel i is not occupied, k is the number of reference points from which distance estimates is taken, and l is the vertical position of the layer.

A number of layers in a given column may be determined according to a Bayesian Information Criterion or a penalty automatically or manually chosen for any additional layer.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings:

FIGS. 7(a), 7(b) and 7(c) are input images of a scene, FIGS. 7(d), 7(e) and 7(f) are depth maps of the images of 7(a), 7(b) and 7(c), FIG. 7(g) is a height map generated from the depth maps, FIG. 7(h) is a three dimensional model generated from the height map, and FIG. 7(i) is a textured three dimensional model generated from the height map.

FIGS. 10(a) and 10(b) are renderings generated by a conventional depth map model, while FIGS. 10(c) and 10(d) are renderings generated by a height map model according to some embodiments.

FIGS. 11(a), 11(b) and 11(c) are untextured three dimensional models of a scene, while FIGS. 11(d), 11(e) and 11(f) are textured three dimensional models of the scene.

FIGS. 12(a) and 13(b) are untextured three dimensional models of a scene, while FIGS. 12(c) and 12(d) are textured three dimensional models of the scene.

FIGS. 13A and 13B illustrate example features that can be reproduced using one layer and three layer height maps, respectively.

DETAILED DESCRIPTION OF EMBODIMENTS

Figure 1A:
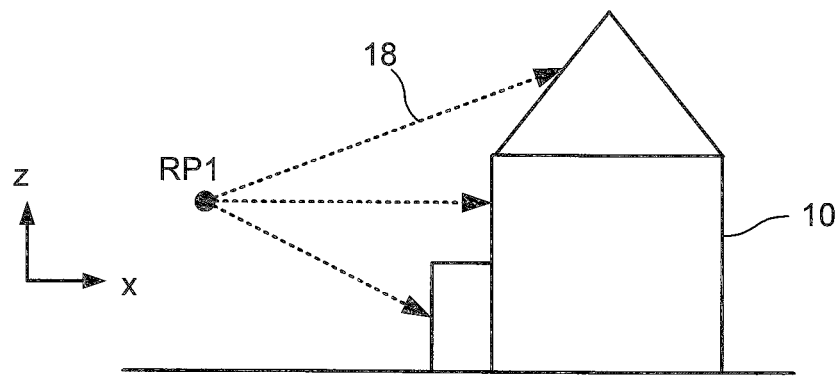
FIGS. 1A, 1B, 1C, 1D and 1E illustrate basic model parameters for systems/methods according to some embodiments.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Some embodiments of the present invention provide a fast approach for automatic dense large scale three dimensional urban reconstruction from image data, such as a video signal or photos. Systems/methods according to some embodiments may employ a multi-view depth map fusion algorithm to obtain a "water tight" surface representation (i.e. a surface representation that does not have holes in the surface) for urban environments from ground-level image/video data. In the model, the surface is represented by a height map. Whereas most other systems attempt to produce true three dimensional surfaces, systems/methods according to some embodiments produce what can be called a 2.5D representation.

Digital Elevation Maps (DEMs) are typically acquired from aerial or satellite data, and on occasion terrestrial land surveying. These acquisition methods are expensive and time consuming. Systems/methods for height map generation according to some embodiments may provide a less expensive alternative, allowing DEMs to be generated automatically from terrestrial range data. Furthermore, these systems/methods can be used to fuse terrestrial and aerial and/or satellite range information.

Systems/methods for height map generation according to some embodiments may provide an effective means for automatic city modeling from ground level. Range information acquired from city streets or other locations can be used to generate vertical height maps of an urban environment. Because the range source is at ground level, the height map precision may be high enough to capture buildings, terrain, cars, bushes, mailboxes, lamp posts, and other urban features. Note that a single height map cannot adequately capture overhanging structures, such as eves, awnings, tree branches, etc. However, errors in the range measurements which would create such overhanging structures may also be suppressed. For example, reflective or specular surfaces can lead to gross errors for LIDAR and stereo ranging techniques. This may lead to large perturbations or spikes on the glass windows of buildings. These errors may be suppressed by systems/methods according to some embodiments, since some embodiments cannot support such overhanging spikes.

Generating height maps of urban environments leads to an effective way of finding vertical surfaces, such as building facades. In ground-based city modeling, facades are of major importance, since they fill much of the field of view from an urban viewpoint. In a vertical height map, these vertical surfaces can be identified as discontinuities or large and abrupt changes in the height values.

A texture map can be generated for height map-derived models. The surface can be extracted from the height map as a polygonal mesh. A texture map can be generated for the mesh from calibrated color photographs or video. Each point on the surface may be projected into every view, resulting in a distribution of color values. Range data and the height map surface can be used to eliminate color samples from images captured from positions at which the surface point is invisible.

In general, range data refers to information about the range from a camera to various features of a two dimensional (2D) scene captured by the camera. For example, referring to FIG. 1A, range data, which may be obtained by various techniques discussed above, describes the distance from a reference point RP1 along rays 18 to various features of an object in an image frame, such as a building 10, that is captured in the image from the reference point RP1.

Systems/methods according to some embodiments may generate a three dimensional model, in the form of a directional height map, from range data, by fusing range data from multiple viewpoints (or reference points). A directional height map is a two dimensional array of pixels whose values indicate surface displacement from a reference plane. The direction of height displacement is arbitrary and may be different for every pixel. Furthermore, the direction of height displacement can be significantly different than the directions of measurements in the range data.

Figure 1B:
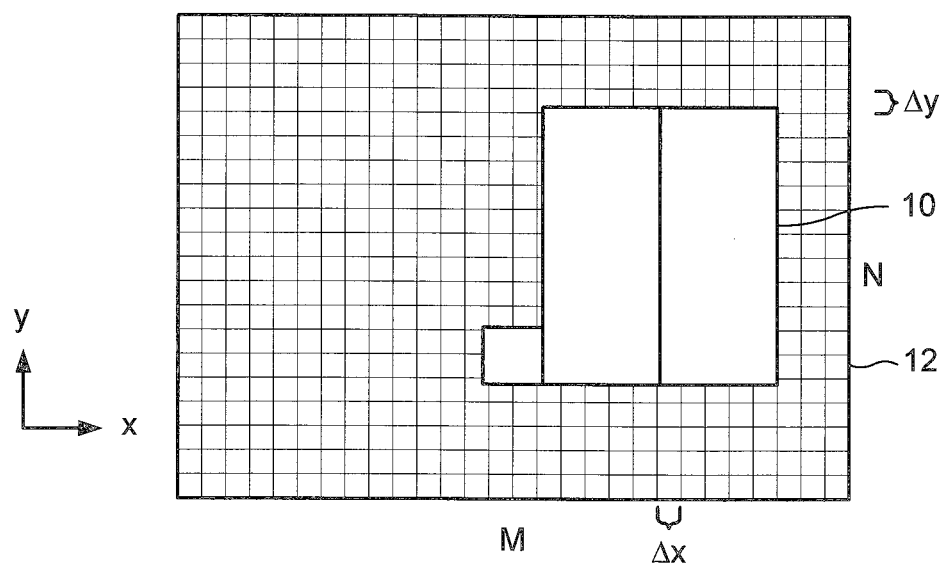

For example, referring to FIG. 1B, a reference plane 12 is illustrated. The reference plane 12, which is illustrated as lying in the x-y plane of a three dimensional Cartesian coordinate system, is divided up into an M×N array of cells, each having dimensions of Δx by Δy. The reference plane 12 may correspond, for example, to a city block, a neighborhood, or any other geographical area. A height map defines a height of a modeled structure, such as the building 10, at each pixel location.

Figure 1C:
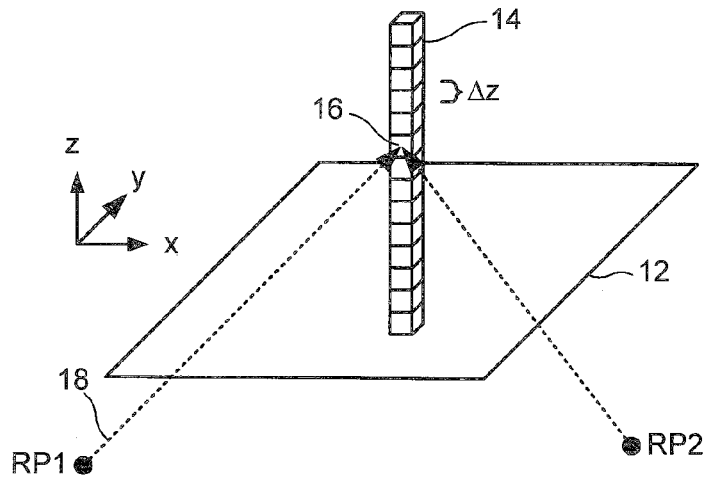

According to some embodiments, the height value at each pixel in the height map may be computed independently. A range of possible displacements is chosen, which defines a column for each cell, illustrated as column 14 in FIG. 1C. The column 14 is divided into individual boxes 16, called voxels, having a height of Δz. For each voxel, a number of weighted votes are accumulated from the range data. Each range measurement is taken along a ray 18 originating from a range source (or reference point) RP1, RP2, etc. The space between the range source and the measured range is assumed to be empty (i.e., not occupied by a structure). The point equal to the range measurement is assumed to be full (i.e., occupied by a structure), and the points beyond the range measurements along a particular ray are assumed to be full but with decreasing confidence.

Every range ray 18 that intersects the voxel 16 casts a weighted vote. The voting scheme may be arbitrary. Typically, if the measurement is beyond the voxel (i.e., the ray that intersects the voxel is measured to have a range from the reference point that is larger than the distance from the reference point to the voxel), then a constant-weighted empty vote is cast, and if the measurement is in front of the voxel, then a full vote is cast with a weight that may decrease with distance between the voxel and the measured range. The decrease in weight may be linear or nonlinear with distance. Full votes may be counted positively, and empty votes may be counted negatively in some embodiments.

Figure 1D:
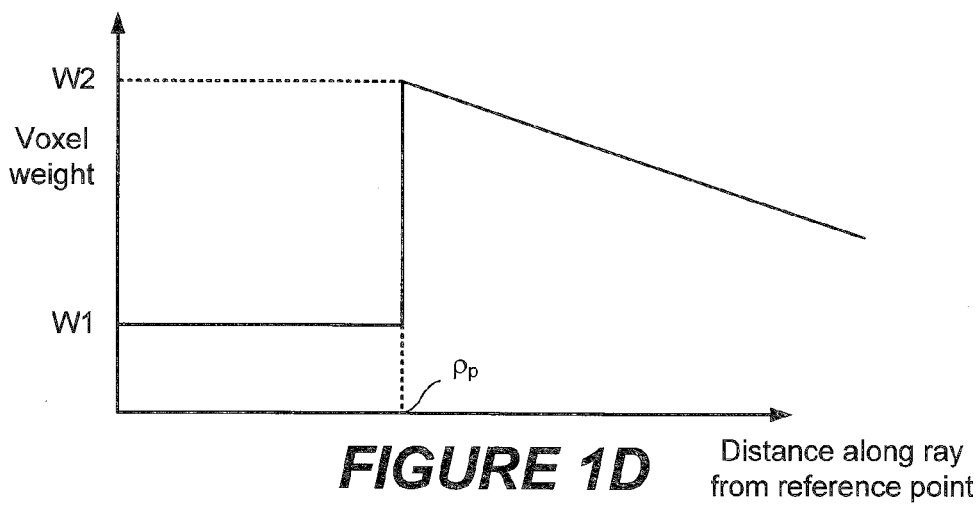

A general voxel weighting technique is illustrated in FIG. 1D. As shown therein, a voxel that is located along a ray 18 in front of the measured distance ($\rho_p$) for a pixel in an image may be assigned a first weight W1. A voxel that is located at the measured distance $\rho_p$ for the pixel may be assigned a vote having a second weight of W2, and voxels that are located farther away along the ray than the measured distance may be assigned a weight that decreases with distance from the reference point.

Figure 1E:
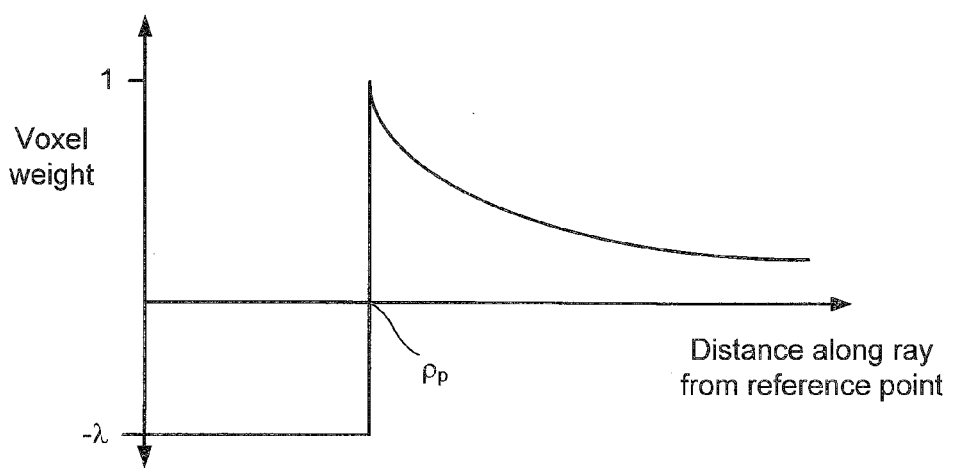

An example of vote weighting is illustrated in FIG. 1E, although other vote weighting schemes are possible in various embodiments. As shown in FIG. 1E, a voxel that is located along a ray 18 in front of the measured distance ($\rho_p$) for a pixel in an image may be assigned a constant weight of $-\lambda_{empty}$. A voxel that is located at the measured distance $\rho_p$ for the pixel may be assigned a vote having a weight of 1, and voxels that are located farther away along the ray than the measured distance may be assigned a weight, such as a positive weight that decreases with distance from the reference point.

For example, the weight may be assigned according to the following equation:

$$\phi_p = \begin{cases} -\lambda_{empty} & \text{if } \rho_v < \rho_p \\ e^{\frac{-|\rho_v - \rho_p|}{\sigma}} & \text{if } \rho_v \geq \rho_p \end{cases} \quad (1)$$

where $\rho_p$ and $\rho_v$ are the depth or range values for the pixel and the voxel with respect to the depth map's reference point, and $\sigma$ defines the rate at which the weight decreases with distance from the pixel. Thus each pixel in the reference image votes "empty" if it's depth value is beyond the voxel, and "full" if it's depth value is in front of the voxel. The value $\lambda_{empty}$ controls the relative weighting between empty and full votes. In the $\rho_v \geq \rho_p$ (full) case, the weight of the vote falls off to reflect the uncertainty of knowing what is "behind" an observed surface. The pixel votes $\phi_p$ for each voxel may then be combined to obtain a weight for the voxel. For example, a mean vote $\phi_v$ may then be generated as a mean of all of the pixel votes $\phi_p$ for a given voxel, and stored in each voxel. The mean vote $\phi_v$ may represent a confidence of being either full (positive) or empty (negative).

It will be appreciated that in other embodiments, voxels located in front of the measured distance may be assigned a weight of zero, and/or the weighting of voxels located behind the measured distance may decrease according to any desired function, including a step function, a linear function, an exponential function, a polynomial function, etc.

Votes may be accumulated by summing. Once the votes have been accumulated for all voxels in a column, the height value may be computed by choosing the height value which reduces, minimizes or otherwise satisfies a cost function. An example of a suitable cost function is the sum of the votes in voxels below the chosen height value minus the sum of the votes in voxels above the chosen height value. Such a cost function may be expressed as:

$$c_z = \sum_{v_z > z} \phi_v - \sum_{v_z < z} \phi_v \quad (2)$$

wherein z is the chosen height value, $v_z$ is the z coordinate of the center of each voxel, and $\phi_v$ is the number of votes in a voxel.

A minimum of the cost function may be found by looping over all the voxels in the column and recording the height value with the lowest cost. The cost function can be computed as a running sum, and so a value, such as a minimal value, can be found in O(n) time, where n is the number of voxels in the column. In this expression, the term O(n) represents a generic computation cost. A computation time of O(n) indicates that the computation time in this case is proportional to n, the number of voxels in the column.

All of the votes along the column may be used to generate the height value decision, which may make the decision highly robust to noise and outliers in the range measurements. This may also allow each height map cell to be computed independently, and so the height map can be computed efficiently, especially if the cells are computed in parallel.

In many instances, the gravity direction will be used as the height direction. This is called a vertical height map, which is a special case of a directional height map. The vertical direction can be easily found using accelerometers attached to the range measurement device. Even for measurement devices in motion, gravity is much stronger than the typical accelerations, and can be reliably acquired. Alternatively the vertical direction can be found by analyzing photographs. Range imaging techniques, such as stereo techniques, use photographs as a source input, and so such data is often available. Photographs of man-made environments contain many vertical lines. The common vanishing point of these lines may indicate the direction of gravity in the photograph, which can then be mapped to a common coordinate system via calibration.

Height map and texture generation according to some embodiments can be implemented using a parallel processing graphics processing unit (GPU). This may speed up computation by approximately 150 times on an Nvidia GTX 280 graphics card. Additional computation gains are anticipated with future generation video processors due to the scalability of some embodiments. The speed of these systems/methods may enable real-time generation of city models from ground-based range data.

In some embodiments, height maps can be enhanced using discontinuity maps. Each layer can be smoothed preserving the discontinuities discovered a priori.

Height maps can be efficiently coded for transmission and storage, since their content is low frequency with few abrupt discontinuities. This may be much more efficient than storing and transmitting the full three dimensional polygonal mesh.

Systems/methods according to some embodiments may provide a simplified model that improves quality over previous approaches. For example, systems/methods according to some embodiments may force a model to have flat vertical structures, may avoid problems that typically arise due to the presence of windows, may force a model to have continuous surfaces, and/or may approximate invisible surfaces. A simplified model according to some embodiments may reduce model complexity over previous approaches. For example, according to some embodiments, height maps can be coded more compactly than general mesh data.

Furthermore, a simplified model according to some embodiments may increase efficiency over previous approaches, as the model can solve a general n-layer height map computation problem.

Further, systems/methods according to some embodiments can provide a less expensive, faster, more robust approach to the problem of providing ground-level three dimensional detail for earth mapping applications.

While the approach described herein may seem to be a more natural fit to aerial and satellite data, it has been found to be a powerful representation for ground-level reconstructions. Systems/methods according to some embodiments have the advantage of producing purely vertical facades, and may also yield a continuous surface without holes. Compared to more general three dimensional reconstruction methods, systems/methods according to some embodiments may be more efficient, robust, and/or may produce more compact models at the expense of losing some minor details like the slight inset of windows in facades, which are represented as part of the facade plane in representations according to some embodiments.

A graphics processing unit (GPU) implementation of systems/methods according to some embodiments can compute a 512×512 height map from 64 depth maps in just 84 milliseconds on an Nvidia GTX 280 graphics card. Furthermore, these systems/methods can be effective for a variety of challenging ground-level datasets, including large buildings, residential houses, and store front facades, producing clean, complete, compact and visually pleasing three dimensional models.

1. Description of Algorithm

Some embodiments provide a novel multi-view depth map fusion algorithm deployed as a post processing step on the range data outputs of systems, such as data outputs from the system one disclosed in M. Pollefeys et al., *Detailed Real-Time Urban 3d Reconstruction From Video*, Intl. Journal of Computer Vision (2008), which is incorporated herein by reference. This processing results in a height map model for the scene. That is, for every point defined over a horizontal grid, systems/methods according to some embodiments estimate a single height value. Whereas most other systems attempt to produce true three dimensional surfaces, a simplified model according to some embodiments can be called a 2.5D representation. This simplified model may lead to both an efficient algorithm and to a simplified model representation, addressing the goals of simplification and reconstruction efficiency.

Particular embodiments may provide three dimensional reconstructions from ground or terrestrial level reconnaissance video. Ground reconnaissance (image) data may be easier and cheaper to acquire, and the video cameras may be significantly less expensive than active sensors such as LIDAR.

Additionally, ground-level reconstructions can be used to complement existing reconstructions from aerial and satellite platforms, or to manually created models, such as Google Sketchup models, providing greater detail from a pedestrian perspective. Furthermore, some embodiments extend to the modeling from video when a structure obtained from a motion technique is used, such as the one proposed in M. Pollefeys et al., *Visual Modeling With A Handheld Camera*, Intl. Journal of Computer Vision (2004), which is incorporated herein by reference.

Similar to volumetric reconstruction approaches, in systems/methods according to some embodiments, a 2D horizontal grid is defined over the region of interest. To avoid the excessive memory usage of the volumetric approaches, for every 2D grid cell, a height value is computed that reduces or minimizes the amount of free space below and the amount of filled space above the value. Free and filled space votes are accumulated from the viewing rays of all depth maps that intersect the vertical column in space defined by the 2D grid cell and the up-vector. Then, a polygonal mesh is generated from the height map. Texture maps may be generated from the images and applied to the polygonal mesh.

Facades of buildings are of particular interest in urban modeling. In a height map representation according to some embodiments, facades appear as large depth gradients between the roof tops and the ground below. These height discontinuities may be detected with a threshold, and strictly vertical polygons may be generated to connect the ground and roof, as discussed below in connection with FIG. 3.

One limitation of systems/methods according to some embodiments, compared to a method that forms a more general geometry representation, is that they may not accommodate overhanging surfaces, such as eaves, inset windows, and larger trees. However, in many of these cases (except for trees) systems/methods according to some embodiments have the advantage of producing purely vertical facades, and also yield a continuous surface without holes, which in fact results in visually more pleasing models than those produced by other modeling systems. Thus, systems/methods according to some embodiments may present a trade-off compared to more general three dimensional reconstruction methods. They may be more efficient, robust, and produce more compact models at the expense of losing some detail.

By design, systems/methods according to some embodiments are well-suited for processing large amounts of video, naturally fusing all votes within an entire vertical column to support the height value decision. Hence, these systems/methods may obtain robust and visually pleasing results even without any additional regularization. The height value at every grid cell can be computed independently, enabling parallelizing of the computation to meet the computational efficiency required. For example, in some embodiments, a commercially available graphics processing unit (GPU) may be used. A commercially available GPU implementation can compute a 512×512 height map in just 84 milliseconds.

The quality of the modeling of systems/methods according to some embodiments has been demonstrated for a variety of challenging ground-level datasets, including large buildings, residential houses, and store front facades. Even though some details cannot be captured by this model, the resulting reconstructions may be clean, complete, and/or compact.

Systems/methods according to some embodiments may operate conceptually over the occupancy grid of a scene (although this is not explicitly required during the computation, which may lead to higher computational efficiency).

2. Height Map Based Stereo Fusion

Systems/methods according to some embodiments are directed to the dense part of three dimensional urban reconstruction, and may employ the redundancy of the estimated depths of the scene typically delivered through depth estimation for every video frame, as for example delivered by a system along the lines of the system disclosed in M. Pollefeys and et al., *Detailed Real-Time Urban 3d Reconstruction From Video*, Intl. Journal of Computer Vision (2008), which is incorporated herein by reference. The inputs to these systems/methods are one or more video sequences along with the estimated camera poses and the intrinsic calibration for every frame, a depth map for every frame, and an estimate of the world's vertical or gravity direction. Camera parameters can be recovered with Structure from Motion (SfM) techniques, as well as from inertial sensor data and/or GPS measurements. Depth maps can be computed robustly and efficiently using GPU-accelerated multi-view stereo, as discussed in S. Kim et al., *Gain Adaptive Real-Time Stereo Streaming*, International Conference on Computer Vision Systems (2007), which is incorporated herein by reference. The vertical or gravity direction can be easily obtained from the inertial sensors or from the vertical vanishing point in each image, as discussed in S. Teller, *Automated Urban Model Acquisition: Project Rationale And Status*, Image Understanding Workshop (1998), pp. 455-462, which is incorporated herein by reference. The output of these systems/methods is a textured three dimensional polygonal mesh.

Figure 2A:
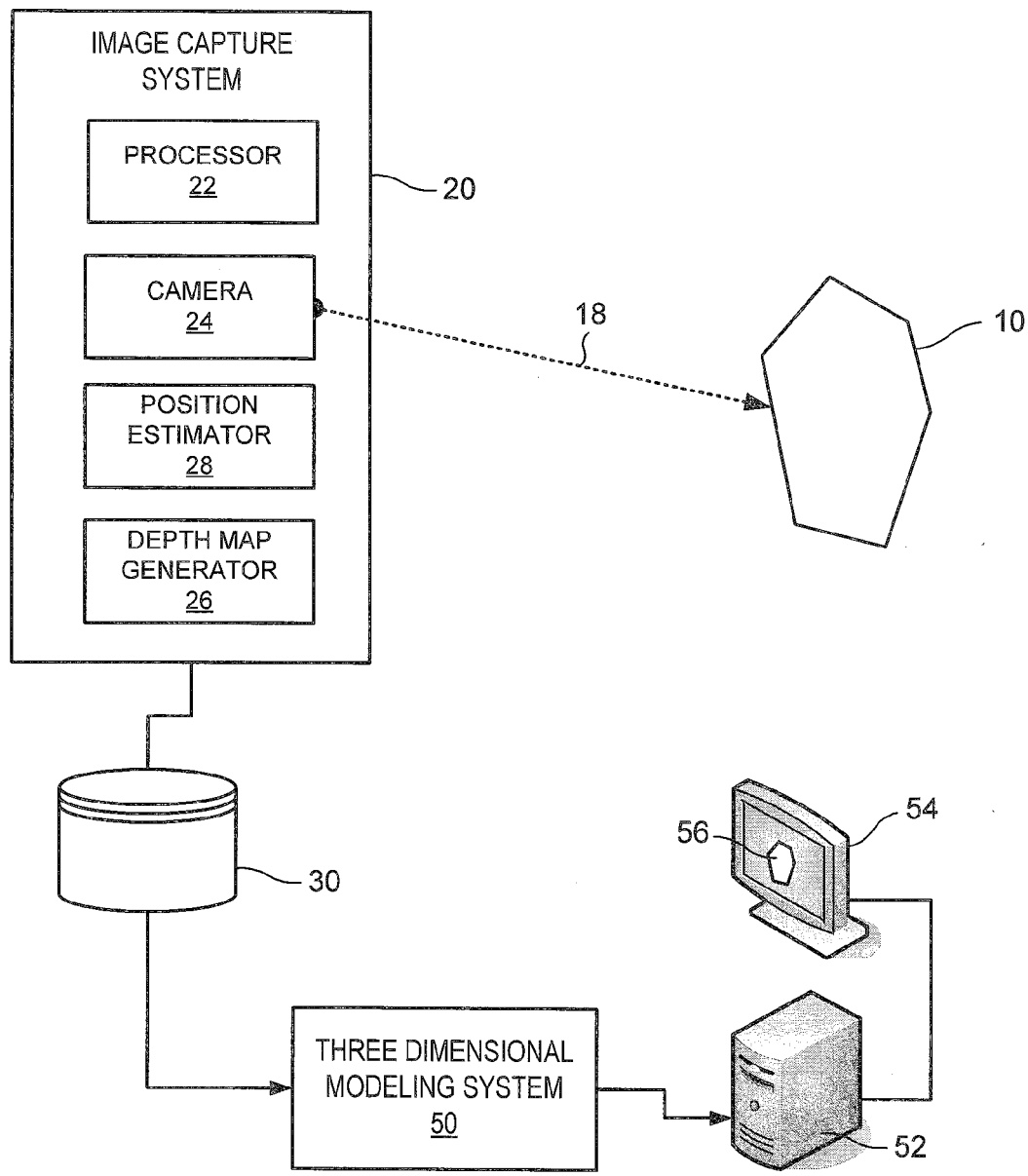
FIGS. 2A and 2B are schematic diagrams that illustrate systems for generating vertical height map models and/or three dimensional models according to some embodiments.
Figure 2B:
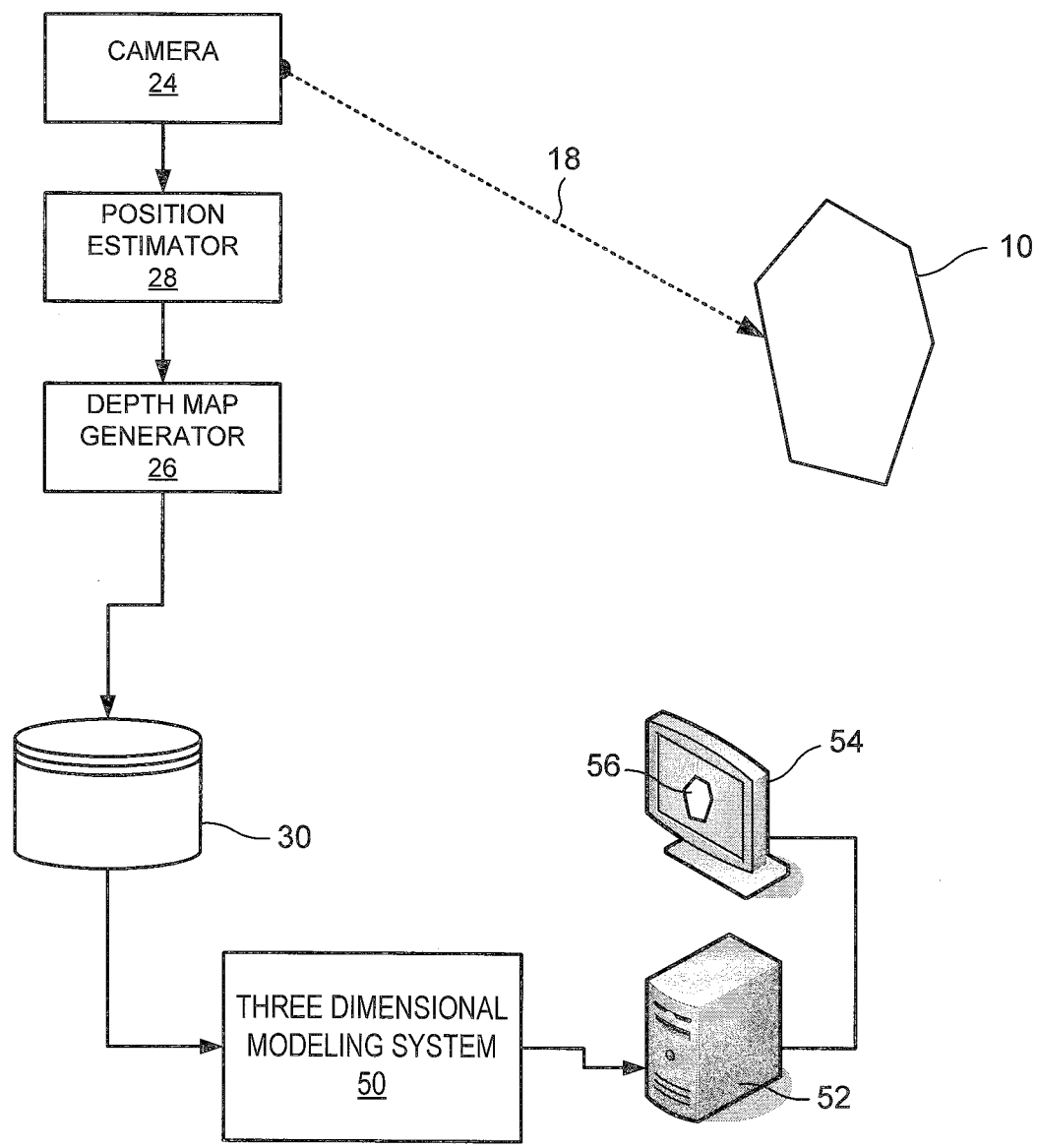
Figure 3:
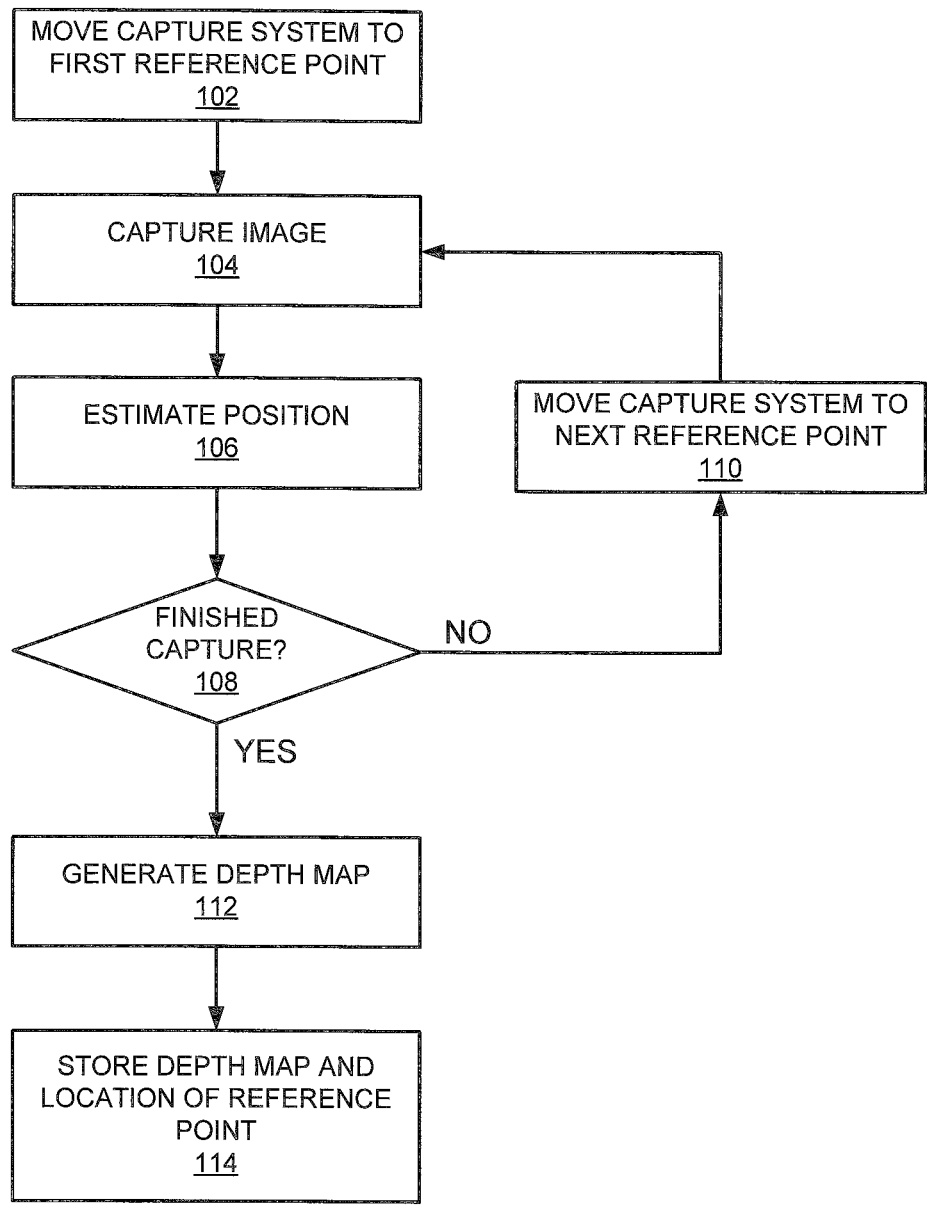
FIG. 3 is a flowchart that illustrates operations for generating image, depth and position data from which vertical height map models and/or three dimensional models can be generated according to some embodiments.

FIGS. 2A and 2B are schematic diagrams that illustrate systems for generating vertical height map models and/or three dimensional models according to some embodiments, while FIG. 3 is a flowchart that illustrates operations for generating image and range data from which vertical height map models and/or three dimensional models can be generated according to some embodiments.

Referring to FIGS. 2A and 3, the system includes an image capture system 20 that includes a processor 22, a camera 24, a depth map generator 26 and a position estimator 28. The output of the image capture system 20, which includes at least one depth map and an indication of the location of the reference point corresponding to the depth map, is stored in a database 30, which may be local to or remote from the image capture system 20. The database 30 may include a volatile storage, such as a random access memory (RAM), or a nonvolatile storage, such as a programmable ROM, a nonvolatile RAM, a disk drive, or other storage means. The database 30 may be accessed locally by the image capture system and/or remotely over a network.

The output of the image capture system 20 stored in the database 30 may be accessed by a three dimensional modeling system 50, which generates a height map model in response to the depth map information stored in the database 30. The three dimensional modeling system 50 may also generate a textured or untextured three dimensional mesh representation from the height map model.

The three dimensional modeling system may include a specialized graphics processing unit (GPU) that is designed specifically for processing graphics data, and/or may include a generic processor.

The height map model and/or the textured or untextured three dimensional mesh representation can be output to a display server 52 and rendered as a three dimensional rendering 56 on a monitor screen 54 connected to the display server 52.

The image capture system 20 may be mobile and/or transportable, so that it may be used to capture images of an object 10 or other scene from multiple reference points. The camera may include a digital camera configured to capture and record high resolution digital images, which are well known in the art. Accordingly, in some embodiments, the image capture system may first be moved to a first reference point (FIG. 3, Block 102). An image may then be captured from the first reference point (FIG. 3, Block 104).

The position estimator 28 may include well known inertial navigation systems (INS) and/or global positioning system (GPS) sensors that can generate a precise location estimate for the image capture system 20. However, in some embodiments, the position of the camera can be estimated from the images themselves.

When an image is captured, the processor 22 may obtain a position estimate from the position estimator 28 and associate the position estimate with the captured image. (FIG. 3, Block 106). The position estimator 28 may also be configured to determine an angular direction (e.g., azimuth and elevation) at which the camera was directed when the image was captured. The position information associated with an image may thus include the geographic location of the camera as well as the angular direction the camera was pointing when the image was captured.

If it is desired to capture data from another reference point, the image capture system 20 may then be moved to the next reference point (FIG. 3, Block 110), and the above-described steps may be repeated to obtain image, position and depth data for the new reference point.

Once one or more images have been captured, the depth map generator 26 may generate an estimate of the distance of one or more pixels/fields/regions in the image from the image capture system 20. (FIG. 3, Block 112). For example, the depth map generator may operate as described in M. Pollefeys et al., *Detailed Real-Time Urban 3d Reconstruction From Video*, Intl. Journal of Computer Vision (2008), which is incorporated herein by reference.

The captured information may then be stored (FIG. 3, Block 114), for example, in a database 30.

Accordingly, the output of the image capture system 20 that is stored in the database 30 may include raw image data generated by the camera 24, position data generated by the position estimator 28 and associated with the image data, and range data for the image generated by the depth map generator 26 and associated with the image data.

Referring to FIG. 2B, the camera 24, position estimator 28 and/or depth map generator 26 may be implemented as separate components in some embodiments. For example, images may be captured at different reference points from one or more cameras 24. The images may be provided to a position estimator 28, which may estimate the camera positions from the image data. The image and position information may be provided to a depth map generator 26, which may generate the depth map information from the image and position information, and which may store the position information and the depth map information in the database 30.

In further embodiments, the position estimator 28 and the depth map generator 26 may be implemented in the three dimensional modeling system 50. Accordingly, the three dimensional modeling system 50 according to some embodiments may be able to receive inputs consisting only of a plurality of images of a scene, generate position estimates for the reference points from which the images were captured, generate depth maps from the images and the position information, and generate height maps of the scene from the depth maps and position information.

This information may be accessed by a three dimensional modeling system 50 configured to generate a three dimensional mesh from the image data, position data and depth map information in the manner described above. In particular, the three dimensional modeling system 50 may be configured to perform the operations illustrated in FIG. 4, which is a flowchart that illustrates operations for generating a textured polygonal mesh from image, range and position data generated by the image capture system illustrated in FIG. 2 according to some embodiments.

Figure 4:
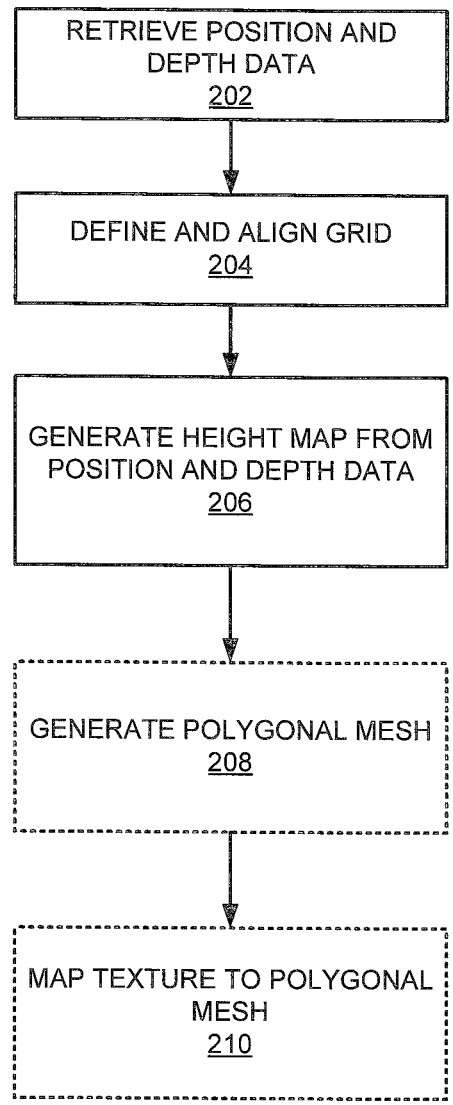
FIG. 4 is a flowchart that illustrates operations for generating a textured polygonal mesh from image depth, and position data generated by the image capture system illustrated in FIG. 2A according to some embodiments.

Referring to FIG. 4, the modeling system 50 may retrieve the image, position and depth data, for example, from the database 30 (Block 202). The rendering system may define and align a grid on which a height map may be defined. In some embodiments, the height map may be a one-layer height map. However, in other embodiments, an m-layer height map may be defined. The grid may be pre-defined, or it may be defined based on an analysis of the reference points and angles from which the image was captured.

In some embodiments, the grid may be defined with respect to one of the input images, called the reference view. According to the desired spatial resolution of the computed model, the size and resolution of the height map may be defined by variables xmin, xmax, ymin, ymax, $\Delta x$, and $\Delta y$. Similarly, the expected height range and height resolution may be defined by zmin, zmax, and $\Delta z$. While xmin, xmax, ymin, ymax, $\Delta x$, and $\Delta y$ directly influence the memory consumption of the computation, the height range and the height resolution may not increase the memory consumption of the algorithm.

Facades and other vertical surfaces will appear as discontinuities in a height map generated by systems/methods according to some embodiments. To avoid staircase discontinuities, the grid's x and y axes may be aligned to the dominant surface normal. This can be done with a surface normal voting procedure. Normals may be computed from the depth gradients in the reference view. Aligning the x and y axes requires only a rotation about the vertical direction. Each normal is projected to the x-y plane, and the angle to the x axis is computed. Votes are accumulated in a histogram, and an angle corresponding to the bin with the most votes may be chosen. Other methods of selecting an angle could be used. The grid axes are then rotated to align with the chosen angle.

With the height map grid defined, all the views in the video sequence that include the volume [xmin, xmax]×[ymin, ymax]×[zmin, zmax] or parts of it in their viewing frustum are loaded and their estimated scene depths will be used in the subsequent steps.

Once the grid has been defined, a height map may be generated according to embodiments of the invention from the image data, position data and depth map information (Block 206) as described in more detail with respect to FIG. 5.

After the height map has been generated, a polygonal mesh may optionally be generated from the height map data (Block 208). This step may enforce the planar representation of facades and walls in scenes, such as general urban scenes. Height discontinuities may be detected between neighboring height values by thresholding of the absolute height difference with a discontinuity threshold, $\lambda_{disc}$. To model the domain knowledge of facades and walls corresponding to these discontinuities, planes may be generated to span them.

Finally, textural information from the image data may optionally be mapped to the polygonal mesh (Block 210). The texture of a surface in the model may be generated as a composite of all images observing the surface, as generally no single image observes the full geometry.

Each single height map represents the geometry measured by all views that include the volume [xmin, xmax]×[ymin, ymax]×[zmin, zmax] or parts of it in their viewing frustum as explained above. Hence there is a need to generate a texture as a composite of all images observing this scene geometry, as generally no single image observes the full geometry. Furthermore the texture generation should preferably be robust to occlusion.

Systems/methods according to some embodiments generate initially blank texture maps with texture coordinates assigned to every vertex in the mesh. Once the texture map has been laid out on the surface, the three dimensional point corresponding to each pixel can be computed. That point is projected into all the images, and the color of each point is stored in an array. The texel color may be computed simply as the median value of the array for each color channel.

Other texture map generation methods may be employed, such as those described in J. Xiao et al., *Image-Based Street-Side City Modeling*, SIGGRAPH Asia (2009). However, the methods described above may be faster and/or more robust to occlusion.

Systems/methods according to some embodiments may generate initially blank texture maps with texture coordinates assigned to every vertex in the mesh. Once the texture map has been laid out on the surface, the three dimensional point corresponding to each pixel can be computed. That point is projected into all the images, and the color of each point is stored in an array. The texel (texture pixel) color may be computed simply as the median value of the array for each color channel. Other texture map generation methods may be employed, such as those described in J. Xiao et al., *Image-Based Street-Side City Modeling*, SIGGRAPH Asia (2009).

Figure 5A:
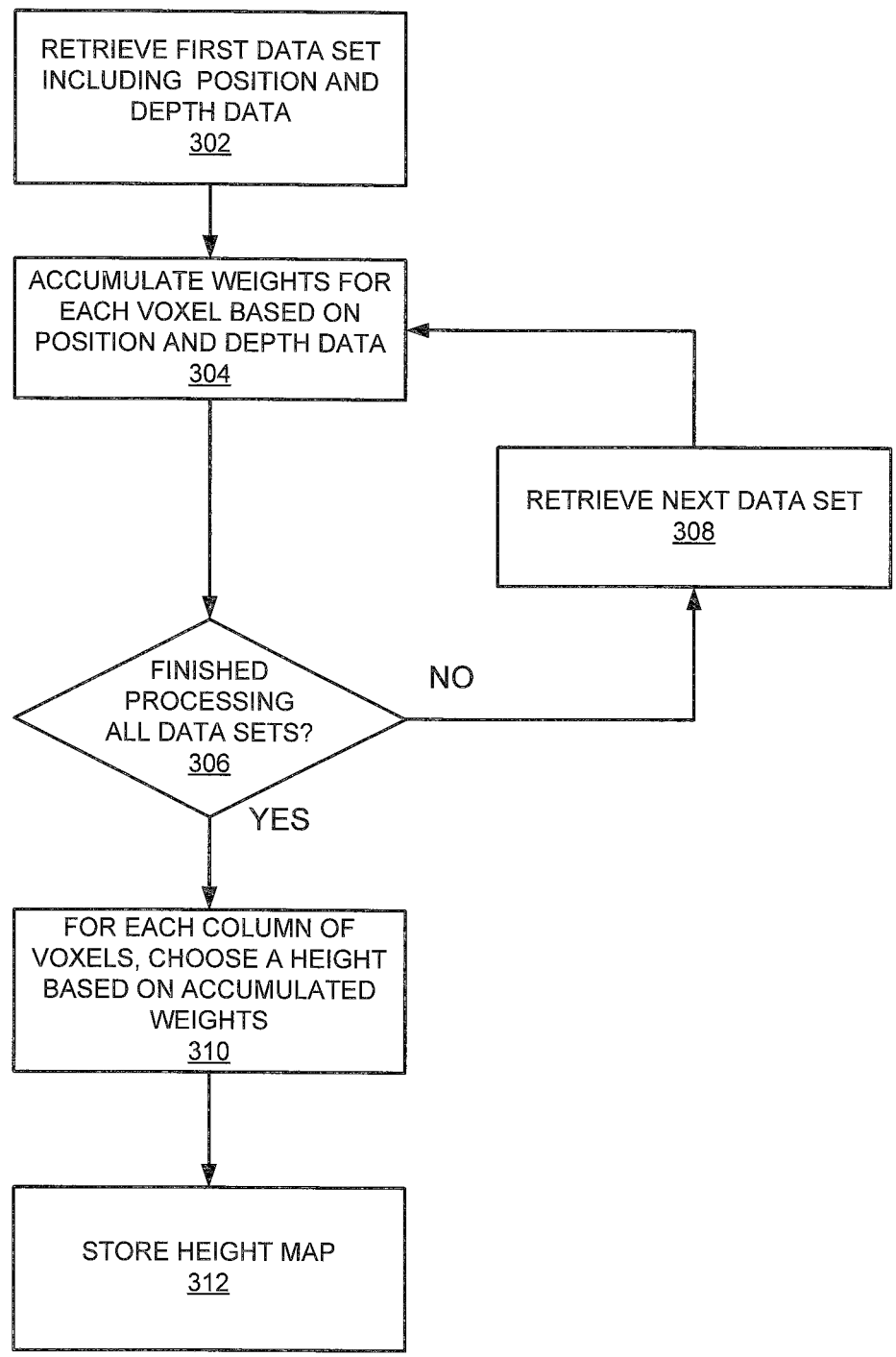
FIGS. 5A and 5B are flowcharts that illustrate operations for generating a vertical height map model from depth and position data generated by the image capture system illustrated in FIG. 2A according to some embodiments.

FIG. 5A is a flowchart that illustrates operations for generating a vertical height map model from position and depth map data, such as position and depth data generated by the systems illustrated in FIG. 2A or 2B according to some embodiments. As shown therein, a vertical height map model may be generated from position and depth map data by retrieving a first data set including position and depth map information (Block 302). For each voxel within the volume of the grid, votes are accumulated (Box 304) based the voxel's position relative to the reference point of the depth information for image pixels in the line of sight of the voxel, as illustrated, for example, in FIGS. 1C and 1D, above. In particular, a 1-layer vertical height map may be computed, which includes a height value for every cell in the height map. The vertical column corresponding to the cell is divided into voxels ranging from zmin to zmax at Δz intervals. Each voxel v is projected into every depth map, and a vote $\phi_p$ for each depth pixel p is computed as follows:

$$\phi_p = \begin{cases} -\lambda_{empty} & \text{if } \rho_v < \rho_p \\ e^{\frac{-|\rho_v - \rho_p|}{\sigma}} & \text{if } \rho_p \geq \rho_p \end{cases} \quad (1)$$

where $\rho_p$ and $\rho_v$ are the depth or range values for the pixel and the voxel with respect to the depth map's camera. Thus each pixel votes "empty" if the pixel's depth value is beyond the voxel, and "full" if the pixel's depth value is in front of the voxel. The value $\lambda_{empty}$ controls the relative weighting between empty and full votes. In the $\rho_v >= \rho_p$ (full) case, the vote falls off to reflect the uncertainty of knowing what is "behind" an observed surface. The pixel votes $\phi_p$ may then be combined. For example, a mean vote $\phi_v$ may be generated as a mean of all of the pixel votes $\phi_p$ for a given voxel, and stored in each voxel. The mean vote $\phi_v$ may represent a confidence of being either full (positive) or empty (negative).

The operations then proceed to Block 306, where it is determined if there are additional data sets to process. If so, the next data set is retrieved including position and depth map information (Block 308), and the votes for each voxel are adjusted based on the new information.

After the votes have been accumulated, the height value z for the column may then be chosen (Block 310). For example, a height value may be chosen for the column that reduces or minimizes the cost function of equation (2), reproduced below:

$$c_z = \sum_{v_z > z} \phi_v - \sum_{v_z < z} \phi_v \quad (2)$$

wherein z is the chosen height value, $v_z$ is the z coordinate of the center of each voxel, and $\phi_v$ is the number of votes in a voxel.

Thus, the height value z for the column may be chosen so that most of the voxels above it are empty and most voxels below it are full. Other cost functions and/or weighting functions may be used, however. For example, a weighting function that weights empty pixels as zero and/or having weights that fall off linearly with distance may be used. Likewise, a cost function that minimizes a difference of sums of squared mean votes may be used.

The final height map may then be stored (Block 312).

Figure 5B:
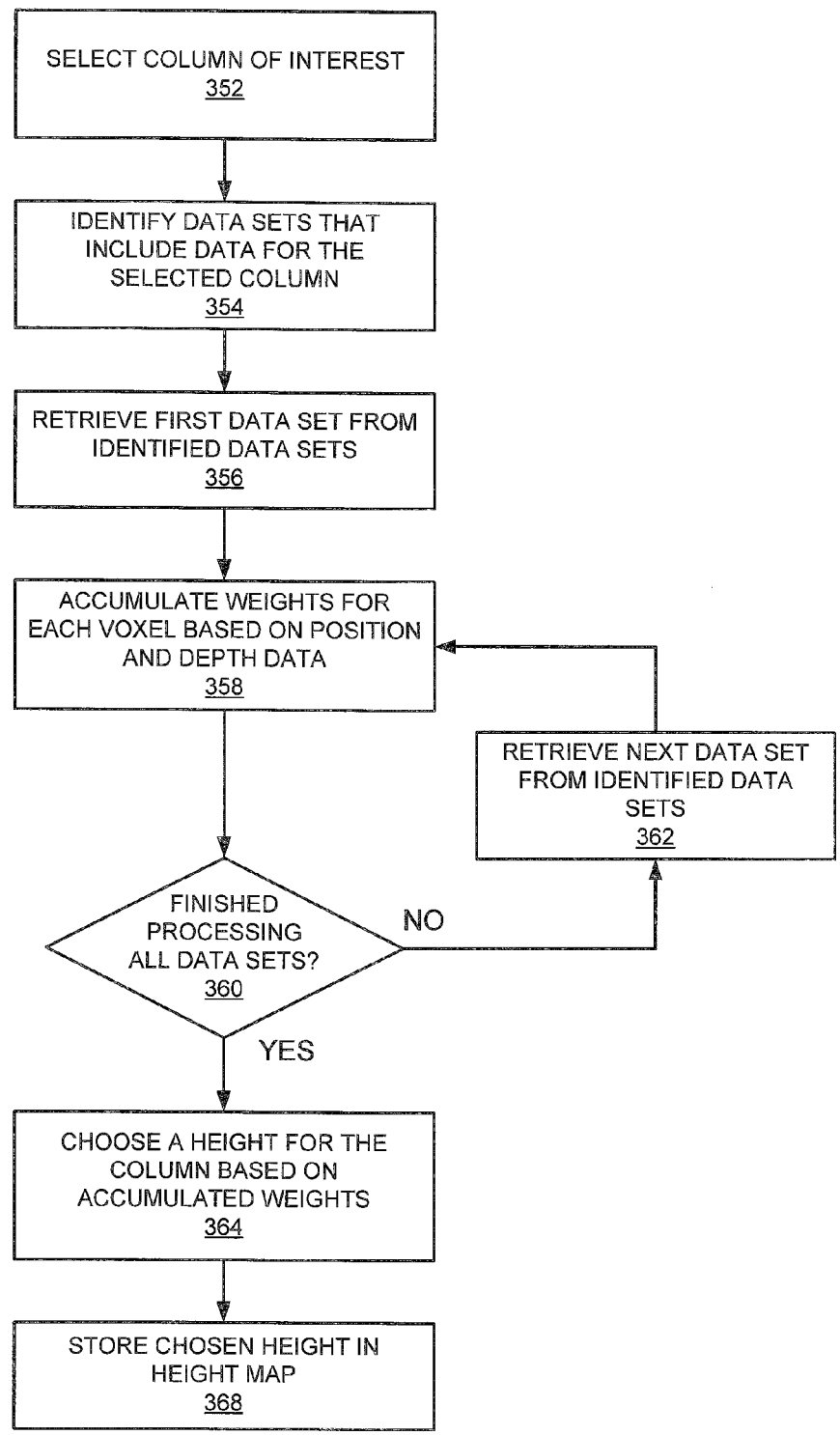

FIG. 5B illustrates operations for generating a vertical height map model from position and depth map data, such as position and depth data generated by the image capture system illustrated in FIG. 2 according to other embodiments.

Referring to FIG. 5B, a vertical height map model may be generated from image, position and depth map data by first selecting a column of interest from the reference plane (Block 352). The data sets (including depth map data and associated position data) that include data for the selected column are then identified (Block 354).

Next, a first data set including position and depth map information are retrieved (Block 356). For each voxel within the column, votes are accumulated (Box 358) based the voxel's position relative to the reference point of the image and depth information for image pixels in the line of sight of the voxel, as illustrated, for example, in FIGS. 1C and 1D, above. In particular, the selected column is divided into voxels ranging from zmin to zmax at Δz intervals. Each voxel v is projected into every depth map, and a vote $\phi_p$ for each depth pixel p is computed as described above.

A mean vote $\phi_v$ may be generated for each voxel as a mean of all of the pixel votes $\phi_p$ for a given voxel, and stored for each voxel.

The operations then proceed to Block 360, where it is determined if there are additional data sets to process. If so, a next data set is retrieved including position and depth map information (Block 362), and the votes for each voxel are adjusted based on the new information. It will be appreciated that data sets may be selected for processing sequentially, randomly or using any desired criteria.

After the votes have been accumulated, the height value z for the column may then be chosen (Block 364). For example, a height value may be chosen for the column that reduces or minimizes a cost function, as described above. The final height for the column may then be stored in the height map (Block 368).

The methods illustrated in FIG. 5B may have particular benefits when parallel processing is used to compute the height values, as the computations for different columns may be independent.

Figure 6:
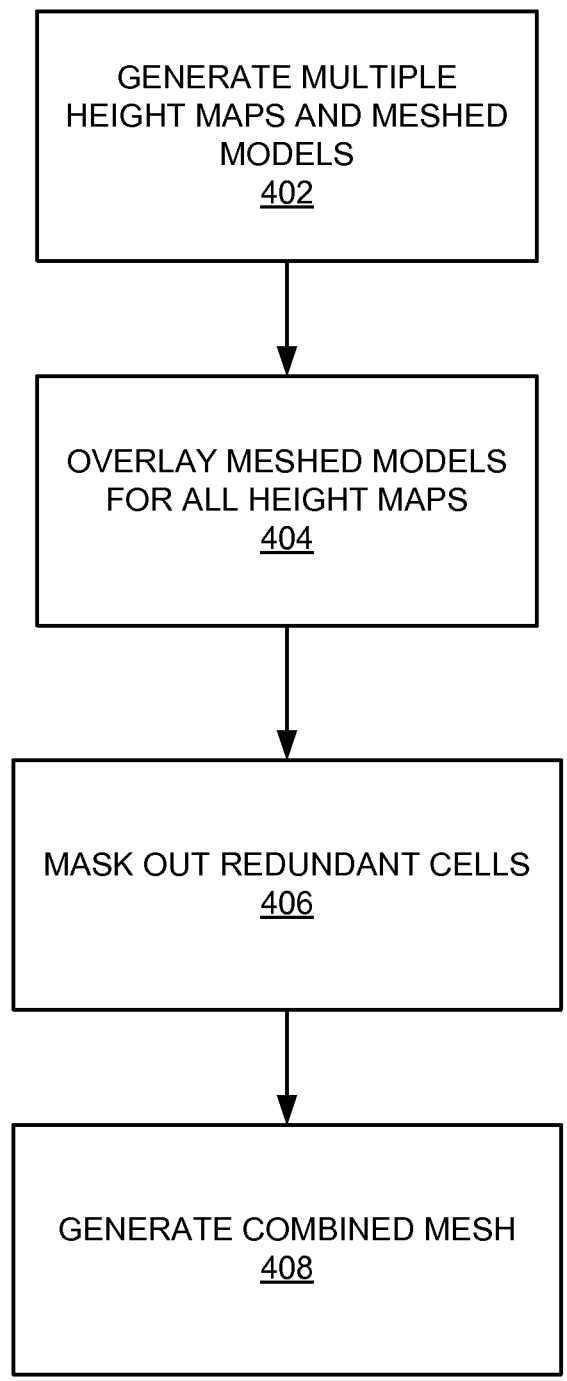
FIG. 6 is a flowchart that illustrates operations for combining a number of vertical height map models according to some embodiments.

FIG. 6 is a flowchart that illustrates operations for combining a number of vertical height map models according to some embodiments. For example, a number of different height map models may be generated according to the embodiments described herein for various regions of an environment. It may be desirable to combine these height map models into a single model.

Referring to FIG. 6, a plurality of different height maps and/or meshed models are generated using the systems/methods described herein (Block 402). The meshed models are then overlayed for all height maps (Block 404). The reference frame may initially be used only to determine the location of the height map. However, all views may contribute equally to the solution.

In order to reduce or eliminate redundant computation, any cells of the current height map that fall within the previously computed height map may be masked out (Block 406). The selection of the view for which a height map is computed is dependent on the camera motion and may be performed dynamically. This may ensure that height maps are computed frequently enough to avoid gaps in the reconstruction, and may keep the height maps spaced far enough apart so that there are a sufficient number of new cells to compute to increase or maximize computational throughput. This may be especially important for the parallel implementation, where there should preferably be enough new cells to keep the GPU hardware fully utilized.

A combined meshed model may then be generated (Block 408)

3. Results

The depth map fusion techniques and texture map generation techniques described above have been implemented on a graphics processing unit (GPU) using NVIDIA's CUDA platform.

Figure 7:
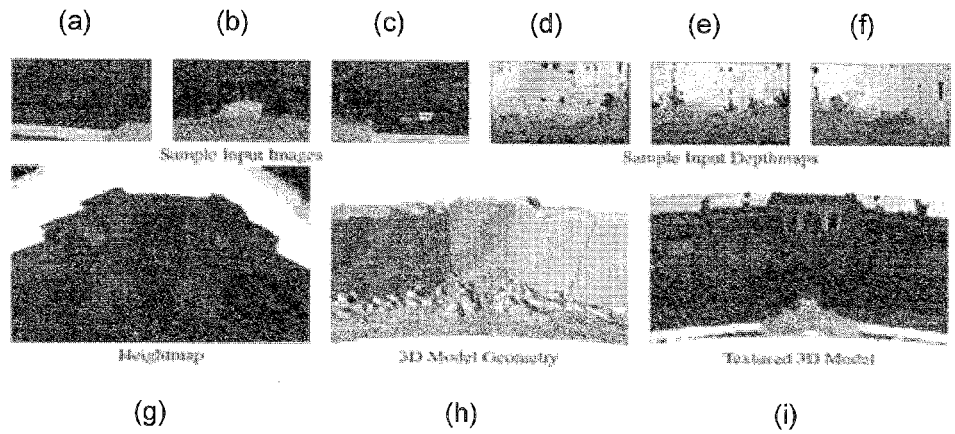
FIG. 7 illustrates depth map fusion techniques according to some embodiments using a vertical height map model to reconstruct a textured three dimensional mesh. In particular.
Figure 8:
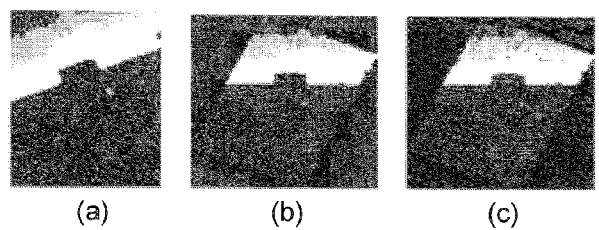
FIG. 8 illustrates (a) Height map computed without axis alignment, (b) a Height map computed with axes aligned to dominant surface normal, where dark red indicates complete blocks where a CUDA kernel can diverge with an early exit, and (c) a Height map computed with axes aligned to dominant surface normal where bright red indicates detected height map discontinuities.
Figure 9:
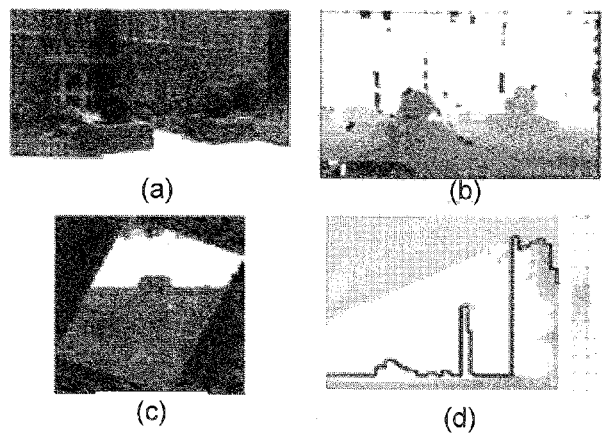
FIG. 9 illustrates (a) a sample input image, (b) a sample input depth map, (c) a computed height map, (d) a slice of the occupancy volume corresponding to the vertical red line on the height map. Votes for every voxel indicate full (positive) or empty (negative). The black line shows the resulting height values for the slice.

FIG. 7 illustrates depth map fusion techniques according to some embodiments using a vertical height map model to reconstruct a textured three dimensional mesh. FIG. 8 illustrates (a) Height map computed without axis alignment, (b) a Height map computed with axes aligned to dominant surface normal, where dark red indicates complete blocks where a CUDA kernel can diverge with an early exit, and (c) a Height map computed with axes aligned to dominant surface normal where bright red indicates detected height map discontinuities. FIG. 9 illustrates (a) a sample input image, (b) a sample input depth map, (c) a computed height map, (d) a slice of the occupancy volume corresponding to the vertical red line on the height map. Votes for every voxel indicate full (positive) or empty (negative). The black line shows the resulting height values for the slice.

While systems/methods described herein can be parallelized using suitable technology, the CUDA platform may have a number of advantages. First, the CUDA platform provides shared memory which multiple threads can access. This may be used to advantage by having a different thread compute the votes for each voxel in a vertical column, and writing the results to an array in shared memory. After the vote accumulation, one of the threads is assigned the task of looping over the array to select the height value, which minimizes equation 2. Second, the CUDA platform allows for divergent branching at a block level. Each block is composed of multiple threads. This may allow for greater efficiency when all cells assigned to a block have been masked out due to overlapping the previous height map. In that case, the block of threads can terminate quickly, freeing up resources for the next block. FIG. 9(b) shows the blocks of a height map layout that can take advantage of this early exit divergence.

Methods according to some embodiments were performed on video data captured from a vehicle-mounted multicamera array. The array consisted of four (4) Point Grey Flea2 color cameras with a resolution of 1024×768 pixels. Three of the cameras were aimed horizontally at 50, 90, and 130 degrees to the driving direction, and one was aimed at 90 degrees horizontally and 30 degrees vertically to the driving direction. Each camera had roughly a 40 degree horizontal and 30 degree vertical field of view, giving the array a combined 120 degree horizontal field of view and 60 degree vertical field of view. The capture system was augmented by an Applanix POS-LV system, which combines inertia sensors and UPS.

Stereo depth maps are computed using the real-time GPU-accelerated multi-view planesweep method discussed in S. Kim et al., *Gain Adaptive Real-Time Stereo Streaming*, International Conference on Computer Vision Systems (2007), which outputs depth maps for each video frame along with the camera positions. Then the images, depth maps, and camera positions may be fed into the system to produce the three dimensional models using the same set of parameters shown in Table 1, below. The method was executed on a personal computer including an Intel Pentium 4 3.2 Ghz CPU, 1.5 GB RAM, and an Nvidia 8800 GTX GPU. This system takes 84 ms to generate the height map, 203 ms to generate the mesh, and 696 ms to generate the texture map, for a total of 983 ms per reference view. Since only a subset of views (roughly every 20th) was used as a reference view, the method effectively ran at 20.3 Hz for the test scenes used.

TABLE 1

| Parameters | |
|---|---|
| [xmin, xmax] | [−5 m, 5 m] |
| [ymin, ymax] | [5 m, 20 m] |
| [zmin, zmax] | [−3 m, 15 m] |
| $\Delta x, \Delta y, \Delta z$ | 20 cm |
| $\lambda_{empty}$ | 0.5 |
| $\sigma$ | 1 |

Using the parameters in Table 1, the system produces highly compact three dimensional models. For every linear meter driven by the capture vehicle, the three dimensional models require only 7500 triangles and 2.3 kilobytes of JPEG compressed texture maps. (These sizes grow linearly with the $\Delta x$ and $\Delta y$ parameters.) Thus these systems/methods may be well suited for reconstructing wide-area urban environments, such as entire cities.

Figure 10:
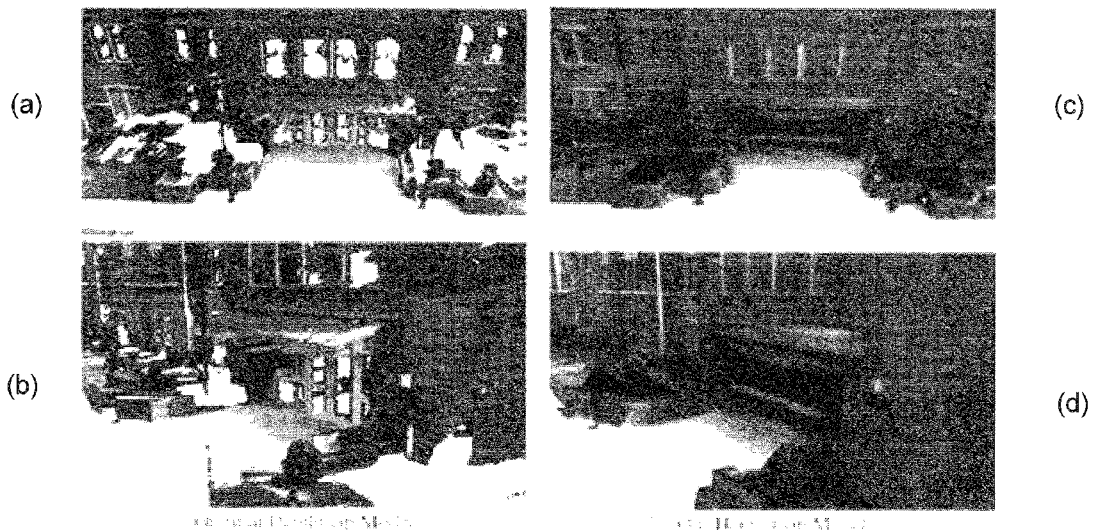
FIG. 10 compares results of a conventional depth map model with results of a height map model according to some embodiments. In particular.

Systems/methods according to some embodiments were tested on a variety of different types of scenes, including streets with large buildings, residential houses, and store front facades. Textured polygonal meshes have been produced directly from the depth map data, and have been compared to the models produced by the present systems/methods, as illustrated in FIG. 10. The present systems/methods perform quite well for surfaces that fit the height map model, especially facades, which are of primary interest for city modeling. The depth map models in general have more detail, and better handle overhanging roofs and trees. However, models produced according to the present embodiments have the advantage of a clean and simple geometry providing a visually more pleasing appearance. The present height map model also produces a continuous surface without holes, whereas the holes in the depth map reconstruction are due to areas of the scene which are never observed. In some sense, the present algorithm may be hallucinating these surfaces, and indeed the textures for the surfaces originate from views, which do not actually see them. Nevertheless the completeness of the surface is an advantage. The holes of the general geometry model along with artifacts around windows cause significant visual disturbances when viewing the model, while the present algorithm forces the geometry of these artifacts into a planar scene determined by the surrounding surfaces. This regularizes many of the artifacts away.

Systems/methods for efficient depth map fusion for large-scale three dimensional reconstruction according to some embodiments may perform the fusion into a height map representation that may ensure a water tight surface model. These models may produce visually more pleasing results than previous methods for obtaining general scene geometry. The models generated by systems/methods according to some embodiments may appear more pleasing, due to the fact that all facade points may be implicitly regularized onto a planar surface, potentially avoiding ambiguities around homogenous surfaces and windows due to their inconsistent appearance.

Although systems/methods according to some embodiments are capable of modeling overhanging surfaces using an n-dimensional directional height map, systems/methods according to some other embodiments may not be capable of modeling overhanging surfaces. However, this may primarily limit only the modeling for larger trees. Systems/methods according to some embodiments may provide significantly more general models than previous approaches that applied constrained geometry modeling, Systems/methods according to some embodiments can, for example, represent vegetation, such as bushes, frequently observed in urban scenes.

In contrast to previous approaches, systems/methods according to some embodiments generate a simple height map model that may provide greater efficiency, robustness and/or compactness, as well as generating a water tight surface that may deliver a visually more pleasing model.

While the approach described herein determines a simplified geometry, the height map model is far less restrictive than the ruled surface model of N. Cornelis et al., *Fast Compact City Modeling For Navigation Pre-Visualization*, Computer Vision and Pattern Recognition (2006), and can model most urban objects and scenes to a large degree. The approach described herein naturally models objects, such as cars, pedestrians, lamp posts, and bushes within the height map framework.

The approach described herein may be less limited than the approaches described in Y. Furukawa et al. Manhattan-World Stereo, Proceedings IEEE CVPR (2009) and S. N. Sinha et al., *Piecewise Planar861 Stereo For Image-Based Rendering*, Proceedings IEEE ICCV (2009), since the height map is able to model most geometries other than overhanging surfaces.

Systems/methods according to some embodiments may be particularly suited for modeling building facades captured from streetlevel video. In addition, the height map generated by systems/methods according to some embodiments may also geometrically represent vegetation typically present in urban scenes, such as bushes, and other objects, such as cars, lamp posts, and mail boxes, to the degree that they have no overhanging structures.

As noted above, some other depth map fusion techniques, such as C. Zach et al., *A Globally Optimal Algorithm For Robust Tv-L1 Range Image Integration*, International Conference on Computer Vision (2007.3), use an occupancy grid for depth map fusion, Although such methods recover a general three dimensional surface from the occupancy grid, systems/methods according to some embodiments may simplify the fusion problem by recovering only a height map. This may allow the systems/methods to be more efficient in terms of processing time and/or memory utilization, potentially providing better scalability.

Figure 11:
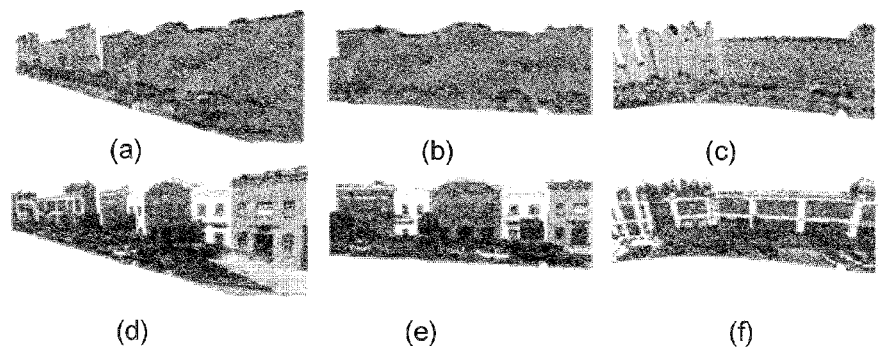
FIG. 11 illustrates untextured and textured three dimensional models produced by systems/methods according to some embodiments. This challenging scene features many reflective cars and glass store-front facades. In particular.
Figure 12:
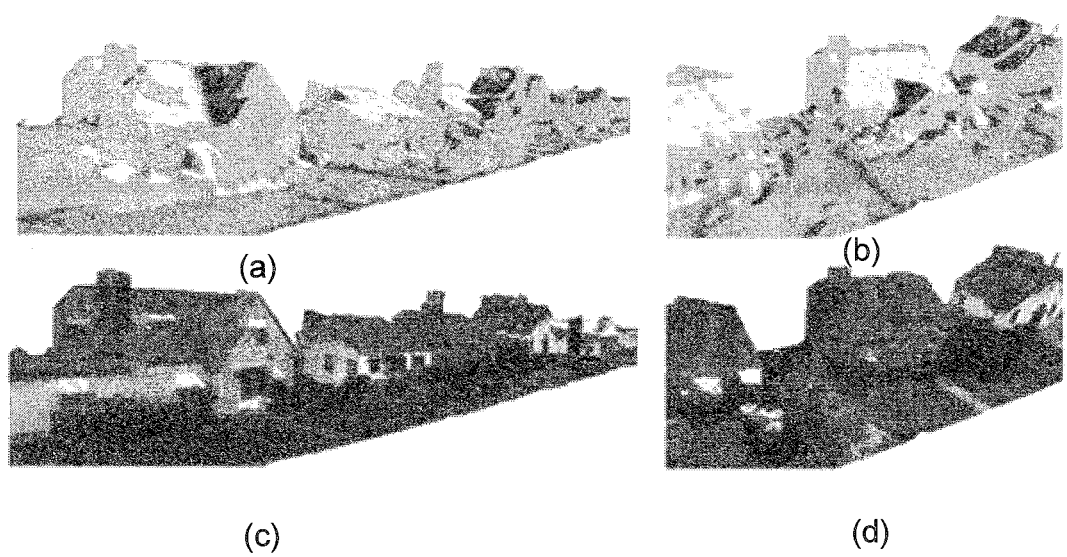
FIG. 12 illustrates untextured and textured three dimensional models of a residential scene produced by systems/methods according to some embodiments. In particular.

FIG. 11 illustrates untextured and textured three dimensional models produced by systems/methods according to some embodiments. This challenging scene features many reflective cars and glass store-front facades. Similarly, FIG. 12 illustrates untextured and textured three dimensional models of a residential scene produced by systems/methods according to some embodiments.

As noted above, overhanging structures cannot be represented by a one-layer height map (i.e., a height map that stores only a single height for each two-dimensional grid location). Therefore some embodiments provide systems/methods for generating an n-layer directional height map. Such a height map may store n height values at every pixel in a two-dimensional grid. Such a model treats each height value as a transition point from full to empty or vice versa. A standard directional height map is a 1-layer height map where the height value represents a transition from full (below the specified height) to empty (above the specified height). A 3-layer height map may be sufficient to represent a single overhanging structure where the transitions are as follows: full|empty|full|empty. However, a height map according to some embodiments may have more than three layers.

Figure 13A:
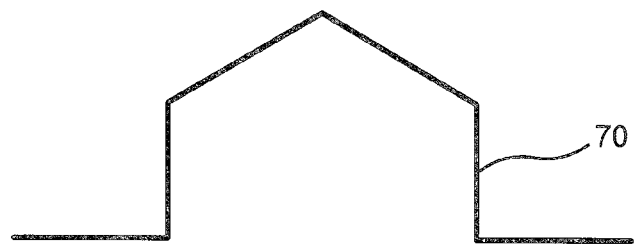
Figure 13B:
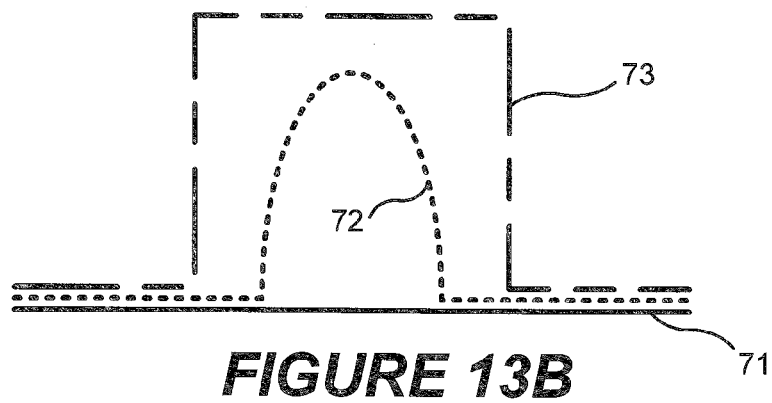

For example, referring to FIG. 13A, a single layer 70 in a one-layer heightmap could be used to represent the height of a structure, such as a house, that has no overhanging surfaces. Referring to FIG. 13B, a one-layer height map could not adequately reconstruct a structure, such as an arch, that has an overhanging surface. However, a three layer height map including layers 71-73 could be used to represent such a structure. In FIG. 13B, layers 71 and 73 represent transitions from occupied space to empty space, and layer 72 represents a transition from empty space to occupied space.

Efficient computation of n-layer height maps may be possible, as the height map can still be computed independently for every pixel. In a straightforward method, every combination of positions for the n layers may be evaluated. However, such an approach would take $O(m^n)$ computation time, where m is the number of voxels in the column and n is the number of layers. However, according to some embodiments described below, an algorithm based on dynamic programming may take only $O(m*n)$ computation time by exploiting independence between non-adjacent layers.

An n-layer height map is a generalization of the single layer height map described above. As discussed above, a single layer height map defines a surface, which is the transition from occupied space to empty space. In an n layer height map, each layer defines a transition from full to empty or vice versa. The number of layers needed to reconstruct a scene can be determined with a vertical line test. For any vertical line in the scene, the number of surfaces that the line intersects is the number of layers in the scene. In some embodiments, a user may provide the number of layers beforehand, although model selection may determine that fewer layers are sufficient.

The input to methods according to some embodiments is a set of images with corresponding camera poses and their associated depth maps. The depth measurements from each camera are used to determine the occupancy likelihood of each point in space, and an n-layer height map is fit based on the occupancy likelihoods. Using a height map for ground-based measurements has the advantage that the estimated parameter, height, is perpendicular to the dominant direction of measurement noise. This may be useful for urban reconstruction, where vertical walls are of particular interest.

Figure 14:
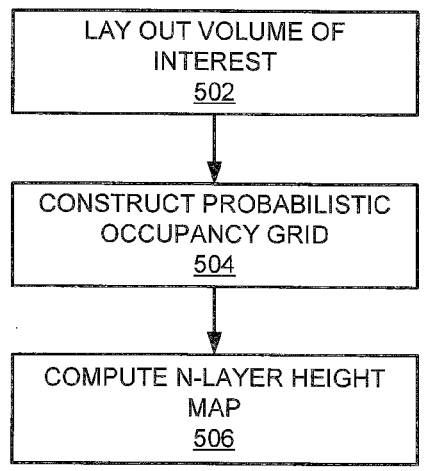
FIG. 14 is a flowchart that illustrates operations for generating an p-layer height map according to some embodiments.

Methods for reconstructing scenes using an n-layer height map are illustrated in FIG. 14. These methods may include the following steps: lay out the volume of interest (Block 502); construct the probabilistic occupancy grid over the volume (Block 504); and compute the n-layer height map (Block 506). Optionally, a mesh may be extracted from the n-layer height map, and texture maps may be generated from the images.

The volume of interest for height map computation is defined by its position, orientation, size, and resolution. Height map computation assumes the vertical direction is known, which can be extracted from the images themselves. Besides that constraint, the volume of interest can be defined arbitrarily. For processing large datasets, such as video images of an entire street, it may be advantageous to define several volumes of interest and process them independently. For video, a frame may be chosen as reference, and the volume of interest may be defined with respect to the camera's coordinate system for that frame. Reference frames may be chosen at regular and/or irregular intervals where the spacing is determined by overlap with the previous volume.

Video data may also contain GPS measurements, so the camera path may be geo-registered, and the vertical direction may be known. For photo collections, the vertical direction can be found using a heuristic derived from photography practices. Most photographers will tilt the camera, but not allow it to roll. In other words, the x axis of the camera typically stays perpendicular to gravity. This heuristic can be used to compute the vertical direction as a homogeneous least squares problem as shown in R. Szeliski, *Image alignment and Stitching: A Tutorial*, Microsoft Research Technical Report (2005). The size and resolution of the volume may be defined as user parameters.

The next step is to compute the probabilistic occupancy grid over the volume of interest. Since the height map layers will be computed independently for each vertical column of the volume, the occupancy grid may not need to be fully stored. Only each column may be stored temporarily, which may keep the memory requirement low. The occupancy likelihood for each voxel may be derived independently. Voxel occupancy is in fact not independent, since it must obey the layer constraint. Computation of layers for a column of voxels using dynamic programming is discussed below. The variables used in the derivation are summarized as follows:

$O_p$: a binary random variable representing the occupancy of voxel p.
$Z_p = Z_1 \ldots Z_k$: depth measurements along rays intersecting voxel p from cameras 1 ... k.
zmin, zmax: depth range of the scene.
σ: depth measurement uncertainty (standard deviation).
S: depth of surface hypothesis.
$L_x = l_1 \ldots l_n$: configuration of layers at point x in the height map. $l_i$ is the vertical position of layer i.

For simplicity, it may be assumed that all depth measurements have the same uncertainty σ, although this is not a requirement.

The likelihood for $O_p$ may be derived as follows. In the following derivation, the subscript p is omitted until multiple voxels are considered for dynamic programming.

$$P(O|Z) \propto P(Z|O)P(O) \qquad (3)$$

$$P(Z|O) = \prod_{i=1 \ldots k} P(Z_i | O) \qquad (4)$$

The notation "P(O|Z)" means the probability of O, the occupancy of the voxel, given Z, the depth measurement of the ray that intersects the voxel. Equation 4 states the assumption that the measurements from different reference points (cameras) are independent. The occupancy prior P(O) is used to slightly bias the volume to be empty above the camera center and full below. That is, the occupancies may be initialized to be 0 for voxels above the camera center and 1 below the camera center. This may help to prevent rooftops extending into empty space since the cameras may not observe them from the ground.

$P(Z_i|O)$ may be determined as discussed in L. Guan et al., *3d Object Reconstruction With Heterogeneous Sensor Data*, 3DPVT (2008) and by introducing a helper variable S, which is a candidate surface along the measurement ray. The depth measurement can then be formulated with respect to S.

$$P(Z_i | O) = \int_{z_{min}}^{z_{max}} P(Z_i | S, O)P(S|O)dS \qquad (5)$$

$$P(Z_i | S, O) = P(Z_i | S) \qquad (6)$$

$$= \begin{cases} \mathcal{N}(S, \sigma)|z_i & \text{if inlier} \\ \mathcal{U}(z_{min}, z_{max})|z_i & \text{if outlier} \end{cases}$$

$$= \rho \mathcal{N}(S, \sigma)|z_i + (1-\rho)\mathcal{U}(z_{min}, z_{max})|z_i \qquad (7)$$

The measurement model is a mixture of a normal distribution N and uniform distribution U to handle outliers. N|Z is the distribution's density function evaluated at Z. ρ is the inlier ratio, which is a given parameter. P(S|O) is the surface formation model defined as follows, where ε→0 and $z_p$ is the depth of the voxel:

$$P(S|O) = \begin{cases} 1/(z_{max} - z_{min}) & \text{if } S < z_p - \epsilon \\ (1 - z_p/(z_{max} - z_{min}))/\epsilon & \text{if } z_p - \epsilon \leq S \leq z_p \\ 0 & \text{if } S > z_p \end{cases} \qquad (8)$$

According to this model, the surface S must be in front of the occupied voxel, but not behind it. The measurement likelihood given that the voxel is empty is denoted by ¬ O. The derivation is the same, replacing O with ¬ O, except the surface formation model is $$P(S|\neg O) = 1/(z_{max} - z_{min}). \qquad (9)$$

The n-layer model will now be defined. The model can be recovered with dynamic programming. The likelihood $L_x$, which is the layer configuration at cell x in the height map, is derived. This cell contains a vertical column of voxels, which we will denote as $O_i$ where i is the height of the voxel ranging from 0 to m.

$$P(L|Z) \propto P(Z|L)P(L) \qquad (10)$$

$$P(Z|L) = \prod_{i=0}^{l_1-1} P(Z|O_i) \prod_{i=l_1}^{l_2-1} P(Z|\neg O_i) \ldots \prod_{i=l_n}^{m} P(Z|\neg O_i). \qquad (11)$$

$$P(L) = \prod_{i=0}^{l_1-1} P(O_i) \prod_{i=l_1}^{l_2-1} P(\neg O_i) \ldots \prod_{i=l_n}^{m} P(\neg O_i). \qquad (12)$$

Note that the measurement likelihoods alternate between the full condition $P(Z|O_i)$ and the empty condition $P(Z|\neg O_i)$ as dictated by the layer constraint. Also note that the number of layers is assumed to be odd, giving the final product the empty condition. This is generally true for outdoor urban scenes. For indoor scenes, an even number of layers could be used.

A cost function C may be defined by taking the negative log-likelihood of P(L|Z), which can simplify the dynamic programming solution.

$$C = -\ln P(Z|L)P(L) \qquad (13)$$

$$= -\sum_{i=0}^{l_1-1} (\ln P(Z|O_i) + \ln P(O_i))$$

$$-\sum_{i=l_1}^{l_2-1} (\ln P(Z|\neg O_i) + \ln P(\neg O_i)). \qquad (14)$$

To simplify the sums over the layers, the following terms may be defined:

$$I_a^b = -\sum_{i=a}^{b} (\ln P(Z|O_i) + \ln P(O_i)) \qquad (15)$$

$$I_a^b = -\sum_{i=a}^{b} (\ln P(Z \mid \neg O_i) + \ln P(\neg O_i)) \quad (16)$$

The sums $I_0^b$ (resp. $\neg I$) for all b can be pre-computed, making it easy to compute $I_a^b = I_0^b - I_0^{a-1}$ (resp. $\neg I$). The cost function can then be written recursively in terms of $C_k$ which is the cost only up to layer k.

$$C_k(l) = \begin{cases} I_{l'}^l + C_{k-1}(l') & \text{if odd}(k) \\ \bar{I}_{l'}^l + C_{k-1}(l') & \text{if even}(k) \end{cases} \quad (17)$$

$$l' = \arg\min_{l' \leq l} C_{k-1}(l') \quad (18)$$

$$C_0(l) = 0 \quad (19)$$

The original cost function is then $C = C_n(m)$ where n is the number of layers and m is the number of voxels in the vertical column.

The layer configuration that reduces or minimizes C can be computed with dynamic programming, because the problem exhibits optimal substructure and overlapping subproblems. The problem has optimal substructure because of the independence between non-adjacent layers, i.e., an optimal configuration of layers 1 . . . i−1 will still be optimal regardless of the position of layer i. (As in $C_k$, only the voxels below the layer are considered.) The overlapping subproblems occur since computing the optimal position of any layer greater than i requires computing the optimal configuration of layers 1 . . . i. Therefore, the optimal configuration can be solved with dynamic programming. The recursive formulation in Equation 21 below lends easily to the table method, and the solution can extracted by backtracking.

Many parts of the height map will not need all n layers. The extra layers will be free to fit the noise in the measurements. To avoid this, a probabilistic metric, such as the Bayesian Information Criterion (BIC) may be implemented as follows:

$$C_{BIC} = -\ln P(Z \mid L) P(L) + \frac{1}{2} n \ln |Z_x| \quad (20)$$

$|Z_x|$ is the number of measurements interacting with the height map pixel x. The first part of the equation is exactly C and the second part adds a penalty of $\ln |Z_x|$ for every layer in the model. We can add this penalty into our recursive formulation by adding $\ln |Z_x|$ at each layer unless the layer position is the same as the preceding layer.

$$C_k^{BIC}(l) = \begin{cases} I_{l'}^l + C_{k-1}(l') + T(l \neq l') \frac{1}{2} \ln |Z_x| & \text{if odd}(k) \\ \bar{I}_{l'}^l + C_{k-1}(l') + T(l \neq l') \frac{1}{2} \ln |Z_x| & \text{if even}(k) \end{cases} \quad (21)$$

In other embodiments, a penalty may be automatically or manually chosen for any additional layer instead of using a Bayesian Information Criterion.

Thus model selection is performed by preferring layers to collapse unless there is sufficient evidence to support them. The table required to solve the problem is of size m×n, and the sum variables are of size m. Therefore the algorithm takes O(mn) computation time and space per height map pixel, and the whole height map takes O(whmn) computation time and O(wh+mn) storage space, where w and h are the resolution on the ground plane (i.e., w=xmax−xmin, and h=ymax−ymin).

Figure 15:
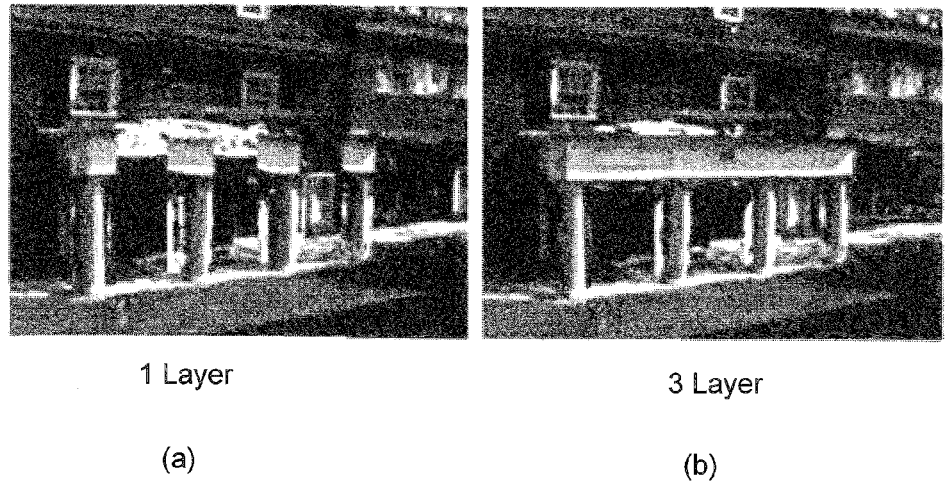
FIG. 15(a) is an image of an arch and FIG. 15(b) is a depth map of the image of FIG. 15(a)

An n-layer height map method according to some embodiments has been implemented using street-level video datasets and photo collections downloaded from the internet. For the video datasets, the camera poses and depth maps were computed with the real-time system of Pollefeys I. To compute the camera poses for the photo collections, the method described in X. Li et al., *Modeling and Recognition of Landmark Image Collections Using Iconic Scene Graphs*, ECCV (2008) may be used. The output of that approach also gives a clustering of the images which can be used to select compatible views for stereo depth estimation. A depth map was computed for each photograph by selecting twenty views in the same cluster with the most matched and triangulated scale-invariant feature transform (SIFT) points in common. Stereo depth estimation was performed on an Nvidia 280 GPU and CUDA platform using a simple normalized cross-correlation planesweep. Results of stereo depth estimation of an object (an arch) having multiple levels are shown in FIG. 15.

From these inputs, the n-layer height map system was used to obtain a three dimensional reconstruction in the form of a texture-mapped three dimensional polygonal mesh. Texture mapping the mesh is a non-trivial problem. However, a simple method may be used to reconstruct the appearance at each point on the surface. In particular, each point may be projected into all cameras, and a 3-channel intensity histogram may be constructed. The histogram votes are weighted by a Gaussian function of the difference between the measured depth and the height map model's depth, which helps to remove the influence of occluders. The per-channel median may be selected as the final color, which is easily obtained from the histograms.

Figure 16:
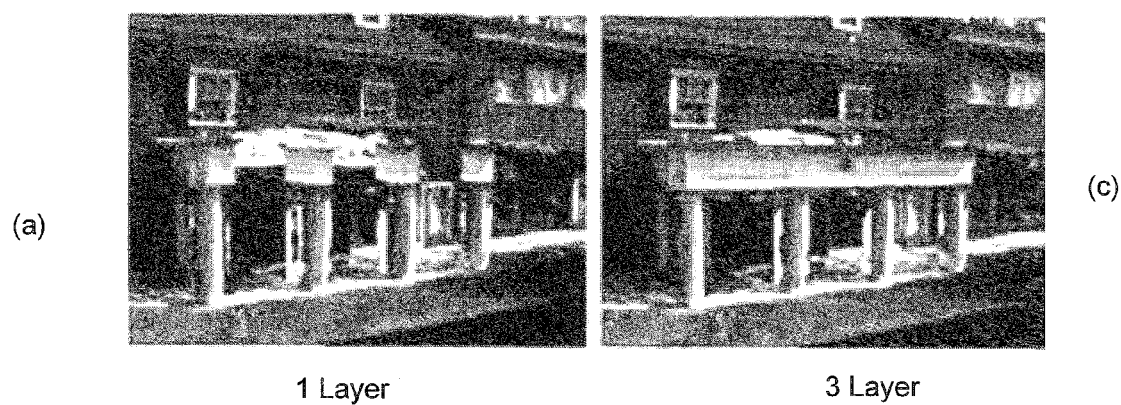
FIGS. 16(a) and 16(b) are three dimensional reconstructions of a scene using a 1-layer height map.
FIGS. 16(c) and 16(d) are three dimensional reconstructions of the same scene using a 3-layer height map.
Figure 16:
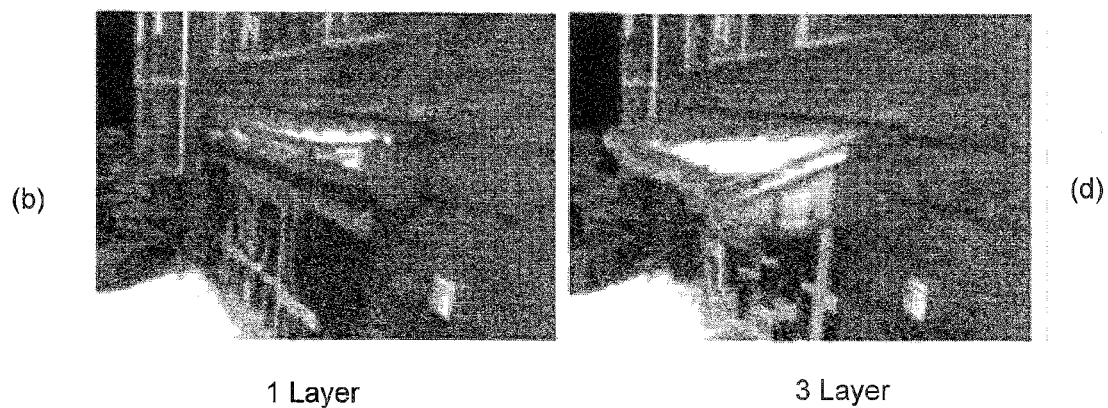
Figure 17:
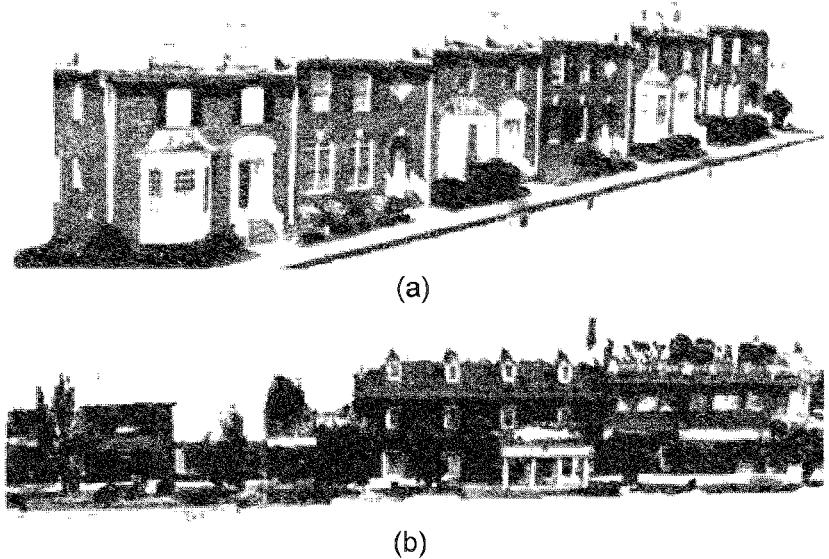
FIGS. 17(a) and 17(b) are three dimensional reconstructions of another scene using a 3-layer height map.
Figure 18:
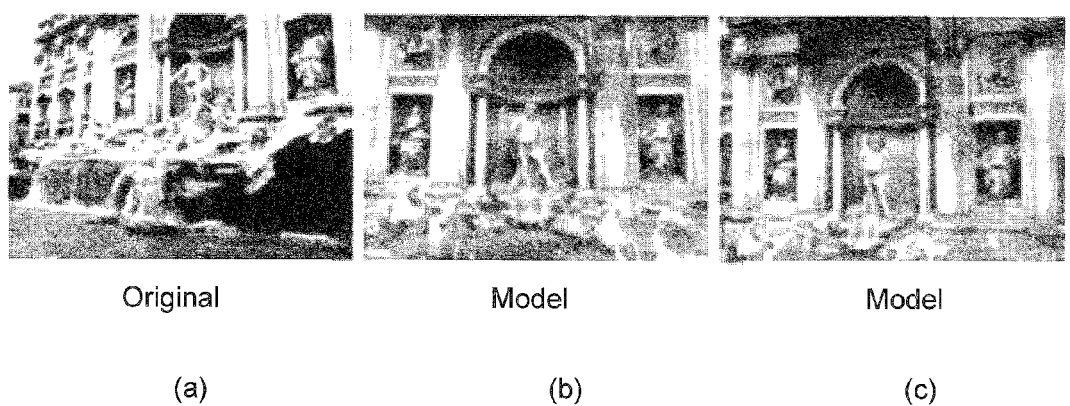
FIG. 18(a) is an image of a three dimensional sculpture.
FIGS. 18(b) and 18(c) are three dimensional reconstructions of the image using a 3-layer height map.

FIG. 16 shows the improvement gained by using multiple layers in the height map. Overhanging structures are recovered while the clean and compact nature of the reconstruction is preserved. FIG. 17 shows the results of the reconstructions from video. FIG. 18 shows the results of the reconstructions from photo collections.

A system according to some embodiments can process video at a rate of 13.33 Hz (frames per second). Computing a 3-layer 100×100 height map with 100 height levels from 48 depth maps takes only 69 ms on the GPU. Converting the height map into a mesh takes 609 ms, and generating texture maps takes 1.57 seconds. The total time for processing a height map is 2.25 seconds. However, height maps only need to be computed about every 30 frames of video. (All frames are used for depth maps.) Therefore the system can process video at 13.33 frames per second. Reconstructing photo collections is more challenging. Most of the scene computation time is spent computing normalized cross-correlation stereo.

As will be appreciated by one of skill in the art, the present invention may be embodied as a method, data processing system, and/or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments of the present invention are described herein with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the present invention may be embodied as machine executable object code. The program code may execute entirely on the user's computer, partly on the user's computer, as a stand alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A method of generating a three dimensional representation of an object in a reference plane, comprising:
    providing a two dimensional grid of cells that define the reference plane in which at least a portion of the object is located;
    providing a three dimensional grid of voxels that define a physical volume above the two-dimensional grid of cells;
    providing a depth map in a processing unit, the depth map comprising distances from a reference point to pixels in an image of the object taken from the reference point, wherein the pixels in the image correspond to features of the object visible in the image;
    assigning weights in the processing unit to respective ones of the voxels in the three dimensional grid along rays extending from the reference point through the pixels in the image based on the distances in the depth map from the reference point to the respective pixels, wherein a weight value for a voxel is assigned based on whether a depth value for a pixel is greater than or less than or equal to a depth value for the voxel along one of the rays; and
    forming, from the depth map, a height map in the processing unit, the height map comprising an array of height values in the reference plane based on the assigned weights.

2. The method of claim 1, further comprising:
    assigning weights to at least some voxels in a column of voxels extending from the reference plane; and
    generating a height for the column in response to the weights in the column.

3. The method of claim 2, wherein generating the height for the column comprises evaluating a cost function.

4. The method of claim 3, wherein the cost function compares a number of full voxels below a chosen height with a number of empty voxels above the chosen height.

5. The method of claim 1, wherein the weights comprise a first plurality of weights, the method further comprising:
    providing a second depth map comprising distances from a second reference point to pixels in a second image of the object taken from the second reference point;
    assigning a second plurality of weights to the respective ones of the voxels in the three dimensional grid along rays extending from the second reference point through the pixels in the second image based on the distances in the second depth map; and
    combining the first and second pluralities of weights.

6. The method of claim 5, wherein combining the first and second pluralities of weights comprises generating mean values of the first and second pluralities of weights.

7. The method of claim 6, wherein forming the height map comprising the two-dimensional array of height values in the reference plane based on the assigned weights comprises evaluating a cost function for voxels in respective columns of voxels.

8. The method of claim 7, wherein the cost function has the form:

$$c_z = \sum_{v_z > z} \phi_v - \sum_{v_z < z} \phi_v$$

wherein z is a chosen height value, $v_z$ is a z coordinate of the center of each voxel, and $\phi_v$ is a mean number of votes in a voxel.

9. The method of claim 1, wherein assigning the weights comprises assigning a negative weight to a voxel that is located closer to the reference point than the distance in the depth map of a ray extending through the voxel.

10. The method of claim 1, wherein assigning the weights comprises assigning a positive weight to a voxel that is located farther from the reference point than the distance in the depth map of a ray extending through the voxel.

11. The method of claim 10, wherein assigning the weights comprises assigning a positive weight that decreases with distance from the reference point to the voxel that is located farther from the reference point than the distance in the depth map of a ray extending through the voxel.

12. The method of claim 11, wherein assigning the weights comprises assigning the weights according to the following equation:

$$\phi_p = \begin{cases} -\lambda_{empty} & \text{if } \rho_v < \rho_p \\ e^{\frac{-|\rho_v - \rho_p|}{\sigma}} & \text{if } \rho_v \geq \rho_p \end{cases} \quad (1)$$

where $\rho_p$ and $\rho_v$ are the depth values for the pixel and the voxel from the reference point, $\sigma$ is a constant that defines the rate at which the weight decreases with distance from the pixel, and $-\lambda_{empty}$ comprises the weight for voxels that are located closer to the reference point than the distance in the depth map of the ray extending through the voxel.

13. The method of claim 1, wherein the height map comprises an n-layer directional height map in which multiple heights are stored for each element in the array, n being an integer greater than one.

14. The method of claim 13, wherein the height values represent transitions from full to empty or empty to full.

15. A system for generating a vertical height map model of an object in a reference plane, comprising:
a database comprising a depth map comprising distances from a reference point to pixels in an image of the object taken from the reference point, wherein the pixels in the image correspond to features of the object visible in the image;
a graphics processing unit; and
a three dimensional modeling system implemented on the graphics processing unit, coupled to the database and configured to assign weights to respective voxels in a three dimensional grid in which the object is at least partially disposed along rays extending from the reference point through the pixels in the image based on the distances in the depth map from the reference point to the respective pixels, and configured to form, from the depth map, a height map comprising an array of height values in the reference plane based on the assigned weights, wherein a weight value is assigned for a voxel based on whether a depth value for a pixel is greater than or less than or equal to a depth value for the voxel along one of the rays.

16. The system of claim 15, wherein the weights comprise a first plurality of weights, the reference point comprises a first reference point, and the depth map comprises a first depth map, and wherein the three dimensional modeling system is further configured to assign a second plurality of weights to the respective ones of the voxels in the three dimensional grid along rays extending from a second reference point through pixels in a second image based on the distances in a second depth map, and to combine the first and second weights.

17. The system of claim 16, wherein the three dimensional modeling system is configured to combine the first and second pluralities of weights by generating mean values of the first and second weights.

18. The system of claim 17, wherein the three dimensional modeling system is further configured to form the height map comprising the two-dimensional array of height values in the reference plane based on the assigned weights by evaluating a cost function for voxels in respective columns of voxels.

19. The system of claim 18, wherein the cost function has the form:

$$c_z = \sum_{v_z > z} \phi_v - \sum_{v_z < z} \phi_v$$

wherein z is a chosen height value, $v_z$ is a z coordinate of the center of each voxel, and $\phi_v$ is a mean number of votes in a voxel.

20. The system of claim 15, wherein the three dimensional modeling system is further configured to assign a first weight to a voxel that is located closer to the reference point than the distance in the depth map of a ray extending through the voxel.

21. The system of claim 20, wherein the three dimensional modeling system is further configured to assign a second weight that is higher than the first weight to a voxel that is located farther from the reference point than the distance in the depth map of a ray extending through the voxel.

22. The system of claim 21, wherein the three dimensional modeling system is further configured to assign a third weight that decreases with distance from the reference point to the voxel that is located farther from the reference point than the distance in the depth map of a ray extending through the voxel.

23. The system of claim 22, wherein the three dimensional modeling system is further configured to assign the weights according to the following equation:

$$\phi_p = \begin{cases} -\lambda_{empty} & \text{if } \rho_v < \rho_p \\ e^{\frac{-|\rho_v - \rho_p|}{\sigma}} & \text{if } \rho_v \geq \rho_p \end{cases} \quad (1)$$

where $\rho_p$ and $\rho_v$ are the depth values for the pixel and the voxel from the reference point, $\sigma$ is a constant that defines the rate at which the weight decreases with distance from the pixel, and $-\lambda_{empty}$ comprises the weight for voxels that are located closer to the reference point than the distance in the depth map of the ray extending through the voxel.

24. A method of generating a three dimensional representation of an object in a reference plane, comprising:
providing a two dimensional grid of cells that define the reference plane in which at least a portion of the object is located;
providing a three dimensional grid of voxels that define a physical volume above the two-dimensional grid of cells;
providing a depth map in a processing unit comprising distances from a reference point to pixels in an image of the object taken from the reference point, wherein the pixels in the image correspond to features of the object visible in the image;

generating a probabilistic occupancy grid in the processing unit; and forming, from the depth map, an n-layer height map in the processing unit, n being an integer greater than one, the n-layer height map comprising an array of layer height values in the reference plane based on the probabilistic occupancy grid.

25. The method of claim 24, further comprising:

determining a probability of a layer in a column of voxels having a given height based on the distances in the depth map.

26. The method of claim 25, further comprising:

evaluating a cost function based on the probability of the layer in the column of voxels having a given height.

27. The method of claim 26, wherein the cost function has the form $$C = \ln P(Z|L)P(L)$$

where P(Z|L) is the probability of a distance measurement Z given a layer height L and P(L) is the probability of a layer height L.

28. The method of claim 27, further comprising evaluating the cost function recursively for k layers according to the function $$C_k(l) = \begin{cases} I_{l'}^l + C_{k-1}(l') & \text{if odd}(k) \\ I_{l'}^l + C_{k-1}(l') & \text{if even}(k), \end{cases}$$

wherein $$I_a^b = -\sum_{i=a}^{b} (\ln P(Z|O_i) + \ln P(O_i)),$$

$$I_a^b = -\sum_{i=a}^{b} (\ln P(Z|\neg O_i) + \ln P(\neg O_i)),$$

$$l' = \arg\min_{l' \leq l} C_{k-1}(l'),$$

$$C_0(l) = 0,$$

and wherein $P(Z|O_i)$ is the probability of a distance measurement Z given that voxel i is occupied, $P(Z|\neg O_i)$ is the probability of a distance measurement Z given that voxel i is not occupied, $P(O_i)$ is the probability that voxel i is occupied, and $P(\neg O_i)$ is the probability that voxel i is not occupied, k is the number of reference points from which distance estimates are taken, and l is the vertical position of the layer.

29. The method of claim 28, wherein a number of layers in a given column is determined according to a probabilistic metric.

30. The method of claim 29, wherein the probabilistic metric comprises a Bayesian Information Criterion.

31. The method of claim 28, wherein a number of layers in a given column is determined according to a non-probabilistic metric.

* * * * *